United States Patent
Zhu

(10) Patent No.: US 12,414,112 B2
(45) Date of Patent: Sep. 9, 2025

(54) METHOD FOR INDICATING FREQUENCY BAND STATE, METHOD FOR DETERMINING FREQUENCY BAND STATE, AND TERMINAL

(71) Applicant: XIAOMI COMMUNICATIONS CO., LTD., Beijing (CN)

(72) Inventor: Yajun Zhu, Beijing (CN)

(73) Assignee: XIAOMI COMMUNICATIONS CO., LTD., Beijing (CN)

( * ) Notice: Subject to any disclaimer, the term of this patent is extended or adjusted under 35 U.S.C. 154(b) by 701 days.

(21) Appl. No.: 17/774,701

(22) PCT Filed: Nov. 8, 2019

(86) PCT No.: PCT/CN2019/116708
§ 371 (c)(1),
(2) Date: May 5, 2022

(87) PCT Pub. No.: WO2021/087984
PCT Pub. Date: May 14, 2021

(65) Prior Publication Data
US 2022/0400504 A1  Dec. 15, 2022

(51) Int. Cl.
*H04W 72/1273* (2023.01)
*H04W 16/14* (2009.01)
*H04W 24/08* (2009.01)
*H04W 72/23* (2023.01)

(52) U.S. Cl.
CPC ....... *H04W 72/1273* (2013.01); *H04W 16/14* (2013.01); *H04W 24/08* (2013.01); *H04W 72/23* (2023.01)

(58) Field of Classification Search
CPC . H04W 17/1273; H04W 72/23; H04W 16/14; H04W 24/08
See application file for complete search history.

(56) References Cited

U.S. PATENT DOCUMENTS

2020/0252891 A1* 8/2020 Chendamarai Kannan ................. H04W 72/23
2021/0368530 A1* 11/2021 Wu ........................ H04W 16/14

FOREIGN PATENT DOCUMENTS

| CN | 109842939 A | 6/2019 |
| EP | 3190819 A1 | 7/2017 |
| WO | WO 2006000955 A1 | 1/2006 |

OTHER PUBLICATIONS

European Patent Application No. 19951399.5, extended Search and Opinion dated Mar. 15, 2023; 7 pages.
Japanese Patent Application No. 2022-526294, Office Action dated May 19, 2023, 8 pages.
(Continued)

*Primary Examiner* — Elton Williams
(74) *Attorney, Agent, or Firm* — Cozen O'Connor

(57) ABSTRACT

A method for indicating a frequency band state is performed by a base station. The method includes: detecting states of n sub frequency bands in a shared spectrum, in which n≥1; in cases where there is an idle sub frequency band in the n sub frequency bands, sending, at a starting position of occupancy time when the idle sub frequency band is occupied, n pieces of preset state indication information to a terminal through the idle sub frequency band, the n pieces of state indication information being used for indicating the states of the n sub frequency bands.

17 Claims, 12 Drawing Sheets

(56) References Cited

OTHER PUBLICATIONS

Japanese Patent Application No. 2022-526294, English translation of Office Action dated May 19, 2023, 7 pages.
Mediatek Inc. "DL Signals and Channels for NR-U Operation" 3GPP TSG RAN WG1 #98bis, R1-1911050, Oct. 2019, 9 pages.
Panasonic "DL signals and channels for NR-U" 3GPP TSG-RAN WG1 #98bis, R1-1911243, Oct. 2019, 10 pages.
Indian Patent Application No. 202247032570, Office Action dated Sep. 21, 2022, 5 pages.
PCT/CN2019/116708 International Search Report, dated Jul. 28, 2020, 2 pages.

\* cited by examiner

METHOD FOR INDICATING FREQUENCY BAND STATE, METHOD FOR DETERMINING FREQUENCY BAND STATE, AND TERMINAL

CROSS-REFERENCE TO RELATED APPLICATION

This application is the U.S. national application of International Application No. PCT/CN2019/116708, filed on Nov. 8, 2019, the entire contents of which are incorporated herein by reference for all purposes.

TECHNICAL FIELD

The disclosure relates to the field of communication technology, and in particular to a method for indicating a frequency band state, a method for determining a frequency band state, an apparatus for indicating a frequency band state, an a apparatus for determining a frequency band state, and an electronic device.

BACKGROUND

With the development of communication technology, it has become difficult for a licensed frequency band to meet communication needs between a terminal and a base station. For example, in a 5G communication system, the communication between the base station and the terminal needs to be extended to a shared spectrum. However, the shared spectrum needs to be detected for determining a state of the shared spectrum before using the shared spectrum. When the shared spectrum is in an idle state, the shared spectrum may be used for communication.

The carrier bandwidth in the 5G communication system is larger than that in the 4G communication system. In order to improve the detection accuracy, the carrier may be divided into a plurality of sub frequency bands (also called subbands). When the carrier corresponding to the shared spectrum includes a plurality of sub frequency bands, detecting the shared spectrum may specifically be detecting each sub frequency band in the shared spectrum.

When the base station needs to occupy the shared spectrum, the base station may detect a state of each sub frequency band in the shared spectrum, generate a detection result based on the state of each sub frequency band, and send the detection result to the terminal, so that the terminal does not have to detect each sub frequency band, rather, it can determine the state of each sub frequency band based on the received detection result.

When the base station determines an idle sub frequency band, the base station may immediately occupy the idle sub frequency band to communicate with the terminal. However, since the base station needs to take some time to generate the detection result based on the state of each sub frequency band, the base station may not immediately send the detection result to the terminal when the idle sub frequency band is occupied, which makes it impossible for the terminal to determine the state of each sub frequency band in time.

SUMMARY

According to a first aspect of the present disclosure, a method for indicating a frequency band state is provided, which is performed by a base station. The method includes: detecting states of n sub frequency bands in a shared spectrum, n≥1; and in response that there is an idle sub frequency band in the n frequency bands, sending n pieces of preset state indication information to a terminal through the idle sub frequency band at a starting position of occupancy time when the idle sub frequency band is occupied, in which the n pieces of preset state indication information are configured to indicate the states of the n sub frequency bands.

According to a second aspect of the present disclosure, a method for determining a frequency band state is provided, which is performed by a terminal. The method includes: receiving n pieces of preset state indication information sent by the base station in an idle sub frequency band of a shared spectrum, n≥1; and
determining states of n sub frequency bands in the shared spectrum based on the n pieces of preset state indication information.

According to a third aspect of the present disclosure, a terminal includes
a processor; and a memory for storing instructions executable by the processor.
The processor is configured to implement the method for indicating a frequency band state. The method includes: receiving n pieces of preset state indication information sent by the base station in an idle sub frequency band of a shared spectrum, n≥1; and determining states of n sub frequency bands in the shared spectrum based on the n pieces of preset state indication information.

BRIEF DESCRIPTION OF THE DRAWINGS

In order to illustrate the technical solutions in the embodiments of the present disclosure more clearly, the following briefly introduces accompanying drawings used in the description of the embodiments. The accompanying drawings in the following description are illustrated for some embodiments of the present disclosure. For those skilled in the art, other drawings may also be obtained from these drawings without creative efforts.

DETAILED DESCRIPTION

The technical solutions in the embodiments of the present disclosure may be clearly and completely described below with reference to accompanying drawings in the embodiments of the present disclosure. The described embodiments are a part of the embodiments of the present disclosure, but not all of the embodiments. Based on the embodiments in the present disclosure, all other embodiments obtained by those skilled in the art without creative efforts shall fall within the protection scope of the present disclosure.

Figure 1:
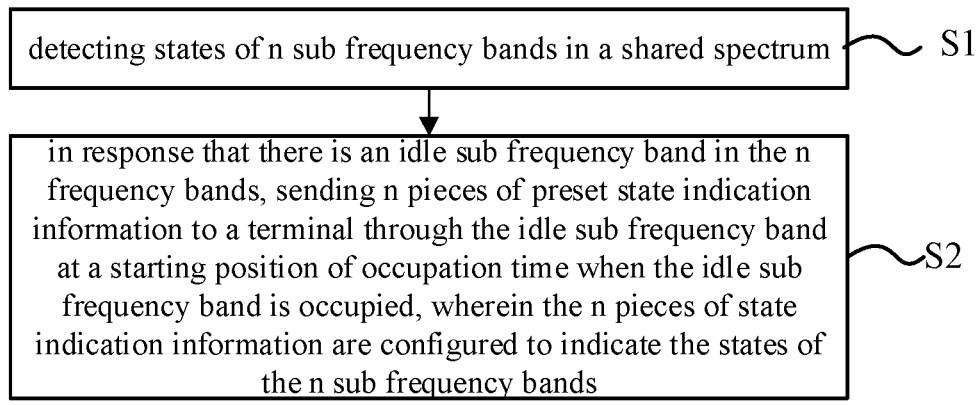
FIG. 1 illustrates a schematic flowchart of a method for indicating a frequency band state according to an embodiment of the present disclosure.

FIG. 1 illustrates a schematic flowchart of a method for indicating a frequency band state according to an embodiment of the present disclosure. The method shown in this embodiment may be applied to a base station, and the base station may communicate with a terminal, for example, may communicate with the terminal based on a 4G protocol or based on a 5G protocol. The base station may communicate with the terminal in a licensed frequency band (for example, a frequency band corresponding to an operator network) or in a shared spectrum (for example, a Wi-Fi frequency band, a Bluetooth frequency band, etc.). The terminal includes but is not limited to an electronic device such as a mobile phone, a tablet computer, and a wearable device.

As shown in FIG. 1, the method for indicating a frequency band state may include the following steps.

At S1, states of n sub frequency bands in a shared spectrum are detected, n≥1.

At S2, in response that there is an idle sub frequency band in the n frequency bands, n pieces of preset state indication information are sent to a terminal through the idle sub frequency band at a starting position of occupancy time when the idle sub frequency band is occupied. The n pieces of state indication information are configured to indicate the states of the n sub frequency bands.

Figure 2:
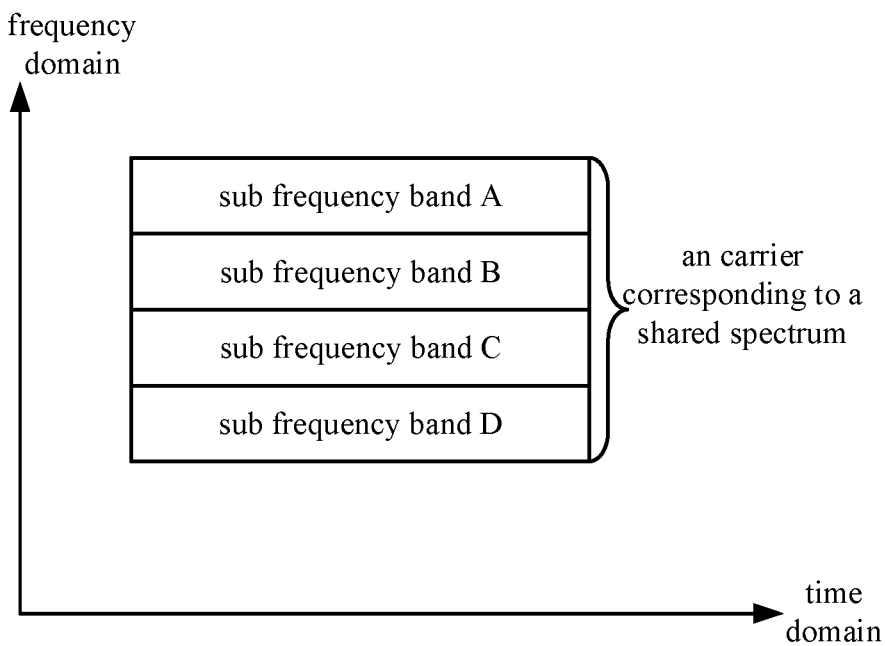
FIG. 2 illustrates a schematic diagram of a sub frequency band according to an embodiment of the present disclosure.

In an embodiment, the shared spectrum may include n sub frequency bands. For example, as shown in FIG. 2, the shared spectrum may include 4 sub frequency bands, i.e., the sub frequency band A, the sub frequency band B, the sub frequency band C, and the sub frequency band D. Each sub frequency band may correspond to an equal bandwidth.

When the base station needs to occupy the shared spectrum to communicate with the terminal, the base station may detect the n sub frequency bands in the shared spectrum to determine the states of each in the n sub frequency bands. For example, each sub frequency band is detected through a Listen Before Talk (LBT) way, specifically for determining whether the sub frequency band is occupied. It may be determined that the sub frequency band is idle when the sub frequency band has not been occupied, and the sub frequency band is non-idle when the sub frequency band has been occupied.

When it is determined that there is an idle sub frequency band in the n sub frequency bands, the idle sub frequency band may be occupied (for example, when a plurality of sub frequency bands are idle, one of the sub frequency bands may be selected for occupation), and the terminal communicates with the terminal through the idle sub frequency band.

However, the occupation when the idle sub frequency band is occupied by the base station is not a permanent occupation, occupancy time needs to be determined. The occupancy time may be referred as channel occupancy time (shortened as COT) and the base station occupies the sub frequency band within the COT.

According to the embodiments of the present disclosure, the base station may send the n pieces of preset state indication information to the terminal through the idle sub frequency band at the starting position of the occupancy time (for example, a time domain unit of the occupancy time, which may be specifically a symbol, a time slot, etc.), so as to indicate the states of the n sub frequency bands to the terminal through the n pieces of state indication information.

Since the n pieces of state indication information are preset (for example, which may be set according to detection results of n sub frequency bands for a previous time or times), the base station has stored the n pieces of state indication information before occupying the idle sub frequency band so that the base station may immediately send to the terminal at the starting position of the occupancy time when the idle channel is occupied, and the terminal may receive the n pieces of state indication information in time to determine the states of the n sub frequency bands and take appropriate actions on the corresponding sub frequency band based on the determined states.

Figure 3:
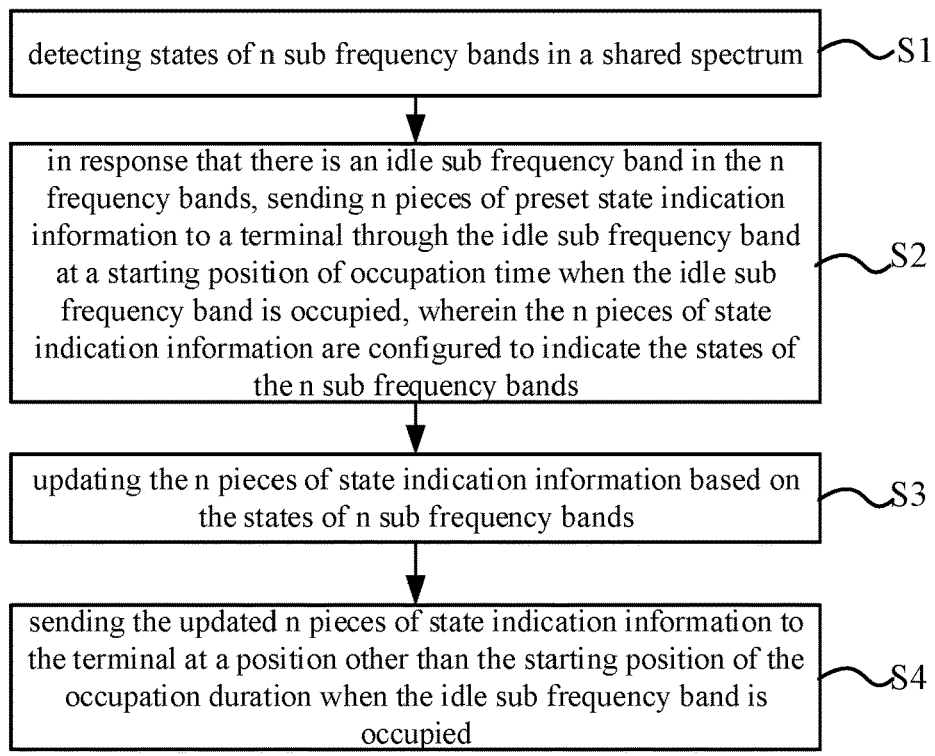
FIG. 3 illustrates a schematic flowchart of another method for indicating a frequency band state according to an embodiment of the present disclosure.

FIG. 3 illustrates a schematic flowchart of another method for indicating a frequency band state according to an embodiment of the present disclosure. As shown in FIG. 3, the method further includes the following steps.

At S3, the n pieces of state indication information are updated based on the states of the n sub frequency bands.

At S4, the updated n pieces of state indication information are sent to the terminal at a position other than the starting position of the occupancy time when the idle sub frequency band is occupied.

In an embodiment, since the n pieces of state indication information are preset, there may be differences between the preset state indication information and actual detection results of the base station for the n sub frequency bands. After the base station sends the n pieces of preset state information to the terminal, the base station may update the n pieces of state indication information based on the detected states of the n sub frequency bands, so that the updated n pieces of state indication information may accurately indicate the actual detection results of the base station for the n sub frequency bands.

Then, at the position other than the starting position of the occupancy time when the idle sub frequency band is occupied (which may be also within the occupancy time, for example, it may be any position behind the starting position), the updated n pieces of state indication information is sent to the terminal, so that the terminal may accurately determine the states of the n sub frequency bands based on the updated n pieces of state indication information.

Optionally, the n pieces of state indication information are arranged in a preset order. The preset order is associated with the n sub frequency bands.

In an embodiment, the n pieces of state indication information sent by the base station may be arranged in the preset order, and the preset order may be associated with the n frequency bands. The terminal may store the association relationship in advance, so that after the n pieces of state indication information are received, the i-th sub frequency band corresponding to the i-th order position may be determined based on the association relationship, and the i-th indication information located in the i-th order position may be determined. The i-th indication information is configured to indicate the state of the i-th sub frequency band, 1≤i≤n.

For example, taking FIG. 2 as an example, the corresponding relationship between the sub frequency band A, the sub frequency band B, the sub frequency band C, and the sub frequency band D and the preset order is that, the sub frequency band A corresponds to the 1st order position, the sub frequency band B corresponds to the 2nd order position, the frequency band C corresponds to the 3rd order position, and the sub frequency band D corresponds to the 4th order position. The 4 pieces of state indication information (i.e., the state indication information a, the state indication information b, the state indication information c, and the state indication information d) are arranged in accordance with the 1st order position, the 2nd order position, the 3rd order position and the 4th order position.

Then, it may be determined that the state indication information a is configured to indicate the state of the sub frequency band A, the state indication information b is configured to indicate the state of the sub frequency band B, the state indication information c is configured to indicate the state of the sub frequency band C, and the state indication information d is configured to indicate the state of the sub frequency band D.

Figure 4:
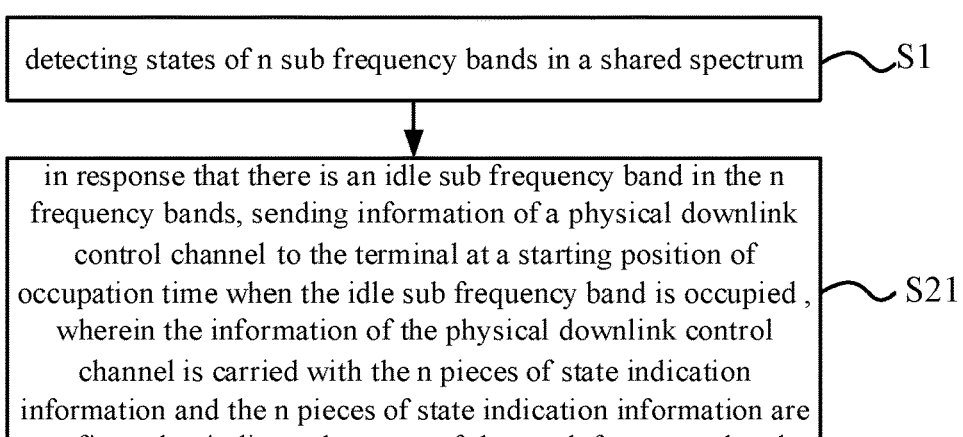
FIG. 4 illustrates a schematic flowchart of yet another method for indicating a frequency band state according to an embodiment of the present disclosure.

FIG. 4 illustrates a schematic flowchart of yet another method for indicating a frequency band state according to an embodiment of the present disclosure. As shown in FIG. 4, sending the n pieces of preset state indication information to the terminal includes the following steps.

At S21, information of a physical downlink control channel is sent to the terminal. The information of the physical downlink control channel is carried with the n pieces of state indication information.

In an embodiment, the base station may send the information of the physical downlink control channel to the terminal in the shared spectrum, and the n pieces of state indication information may be carried in the information of the physical downlink control channel.

Optionally, the state of the i-th sub frequency band in the n sub frequency bands includes one of the following.

The state is idle, or non-idle, or possibly idle.

In an embodiment, the state indication information may be configured to indicate three states: idle, non-idle, and possibly idle. Since there may be differences between the n pieces of preset state indication information and the actual detection results of the base station for the n sub frequency bands, the state indication information may also indicate that the sub frequency band is possibly idle in addition to indicating that the sub frequency band is idle and non-idle.

It should be noted that the n pieces of preset state information may be set according to detection results of the n sub frequency bands for previous preset times.

For example, when the preset number of times is 1 and the previous detection result for the i-th sub frequency band is that the i-th sub frequency band is idle, the state information for the i-th sub frequency band among the n pieces of preset state information is configured to represent the i-th sub frequency band is idle. When the previous detection result for the i-th sub frequency band is that the i-th sub frequency band is non-idle, the state information for the i-th sub frequency band among the n pieces of preset state information is configured to represent the i-th sub frequency band is non-idle. The i-th sub frequency band has not been detected in the past, that is, there is no previous detection result for the i-th sub frequency band, the state for the i-th sub frequency band among the n pieces of preset state information may represent that the i-th sub frequency band is possibly idle.

Optionally, each of the n pieces of state indication information occupies one bit, or a plurality of bits.

In an embodiment, the state indication information may occupy one bit, or the plurality of bits.

In case that the state indication information occupies the plurality of bits, taking two bits as an example, since two bits may represent four situations, the above three states of being idle, non-idle and possibly idle may be comprehensively represented for each sub frequency band. For example, the state indicated by the state indication information is shown in Table 1.

TABLE 1

| state indication information | state of the sub frequency band |
| --- | --- |
| 00 | idle |
| 01 | non-idle |
| 10 | possibly idle |
| 11 | reserved |

In case that the value of the state indication information is 00, it means that the sub frequency band is idle; when the value of the state indication information is 01, it means that the sub frequency band is non-idle; when the value of the state indication information is 10, it means that the sub frequency band is possibly idle, and the value of the state indication information is 11 is "reserved", it does not indicate the state of the sub frequency band for the time being, so that its expression meaning may be set for subsequent use.

In case that the state indication information occupies one bit, it is difficult for the state indication information to comprehensively represent the above three states of idle, non-idle and possibly idle since one bit of the state indication information can represent two situations. In this case, this is explained in the following examples.

Optionally, each in the n pieces of state indication information occupies one bit, and the information of the physical downlink control channel is also carried with position indication information. The position indication information is configured to indicate whether the information of the physical downlink control channel is located at the starting position of the occupancy time when the idle sub frequency band is occupied, or at a position other than the starting position of the occupancy time when the idle sub frequency band is occupied.

In an embodiment, when the state indication information occupies one bit, the terminal may be indicated in combination with the position of the n pieces of state indication information, so that the same state indication information is configured to express different meanings when the n pieces of state indication information are located at different positions within the occupancy time.

The association relationship may be preset between positions and values of n pieces of state indication information. For example, it may be set that, when the n pieces of state indication information is located at the starting position of the occupancy time, 1 in the state indication information represents that the corresponding sub frequency band may be idle, and 0 represents that the corresponding sub frequency band is non-idle; when the n pieces of state indication information are located at a position other than the starting position of the occupancy time, 1 in the state indication information represents that the corresponding sub frequency band is idle, and 0 represents that the corresponding sub frequency band is non-idle.

Accordingly, the three states of idle, non-idle and possibly idle may be comprehensively represented by one bit of state information in combination with the position of the n pieces of state indication information in the occupancy time.

Correspondingly, after the n pieces of state indication information are received, the terminal may determine the position of the n pieces of state indication information in the occupancy time when the idle sub frequency band is occupied, and may query the states of the n sub frequency bands indicated by the n pieces of state indication information corresponding to a position based on the association relationship between positions and values of the n pieces of state indication information. In this way, the states of the n sub frequency bands are determined according to the queried values.

In order to enable the terminal to determine the position of the n pieces of state indication information in the occupancy time when the idle sub frequency band is occupied, the base station may also carry position indication information in the information of the physical downlink control channel sent by the base station. Through the position indication information, it may be indicated whether the information of the physical downlink control channel is located at the starting position of the occupancy time when the idle sub frequency band is occupied or at a position other than the starting position of the occupancy time when the idle sub frequency band is occupied.

Optionally, each in the n pieces of state indication information occupies one bit, and scrambling information in the information of the physical downlink control channel is configured to indicate whether the information of the physical downlink control channel is located at the starting position of the occupancy time when the idle sub frequency band is occupied, or at a position other than the starting position of the occupancy time when the idle sub frequency band is occupied.

In an embodiment, in addition to additionally setting the position indication information in the information of the physical downlink control channel, the scrambling information in the information of the physical downlink control channel may also be configured to indicate whether the information of the physical downlink control channel is located at the starting position of the occupancy time when the idle sub frequency band is occupied, or at a position other than the starting position of the occupancy time when the idle sub frequency band is occupied.

It should be noted that the n pieces of state indication information carried in the information of the physical downlink control channel and located at the starting position of the occupancy time may be the n pieces of preset state indication information in the above embodiments. The n pieces of state indication information carried in the information of the physical downlink control channel and located at the position other than the starting position of the occupancy time (which is also located within the occupancy time, for example, may be any position behind the starting position) may be the updated n pieces of state indication information in the above embodiments.

The information of the physical downlink control channel may be scrambled by a radio network temporary identity (RNTI for short), and the scrambling information may refer to the RNTI itself, or may refer to scrambling information that is configured to scramble the RNTI.

Optionally, the physical downlink control channel is a group common physical downlink control channel.

In an embodiment, the physical downlink control channel may specifically be the group common physical downlink control channel (GC-PDCCH for short). Through the GC-PDCCH, the base station may send the information of the physical downlink control channel to a specific group of terminals.

Optionally, the n sub frequency bands belong to the same carrier, or at least one of the sub frequency bands and other sub frequency bands belong to different carriers, or at least one of the sub frequency bands corresponds to a frequency band of a preset carrier.

In an embodiment, the n sub frequency bands detected by the base station may belong to the same carrier or different carriers. For example, the at least one sub frequency band and other sub frequency bands belong to different carriers. There may also be sub frequency bands corresponding to preset carriers, that is, the sub frequency band is the same as the frequency band of the preset carrier. It may be set according to actual needs to which of the above situations the sub frequency bands specifically belongs.

Figure 5:
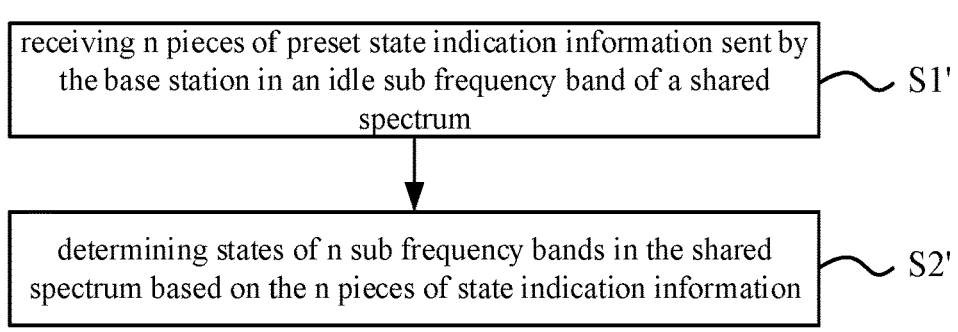
FIG. 5 illustrates a schematic flowchart of a method for determining a frequency band state according to an embodiment of the present disclosure.

FIG. 5 illustrates a schematic flowchart of a method for determining a frequency band state according to an embodiment of the present disclosure. The method shown in this embodiment may be applied to a terminal, and the terminal may communicate with a base station (such as the base station described in any of the above embodiments), for example, may communicate with the base station based on a 4G protocol or based on a 5G protocol. The terminal may communicate with the base station in a licensed frequency band (for example, a frequency band corresponding to an operator network), or in a shared spectrum (for example, a Wi-Fi frequency band, a Bluetooth frequency band, etc.). The terminal includes but is not limited to an electronic device such as a mobile phone, a tablet computer, and a wearable device.

As shown in FIG. 5, the method for determining a frequency band state may include the following steps.

At S1', n pieces of preset state indication information sent by the base station in an idle sub frequency band of a shared spectrum are received, $n \geq 1$.

At S2', states of n sub frequency bands in the shared spectrum are determined based on the n pieces of state indication information.

In an embodiment, the base station may occupy an idle sub frequency band to send the n pieces of preset state indication information to the terminal, because the n pieces of preset state indication information is set in advance (for example, which may be set according to detection results of n sub frequency bands for a previous time or times), the base station has stored the n pieces of state indication information before occupying the idle sub frequency band, so that the base station may immediately send to the terminal at the starting position of the occupancy time when the idle channel is occupied, and the terminal may receive the n pieces of state indication information in time to determine the states of the n sub frequency bands and take appropriate actions on the corresponding sub frequency band based on the determined states.

Figure 6:
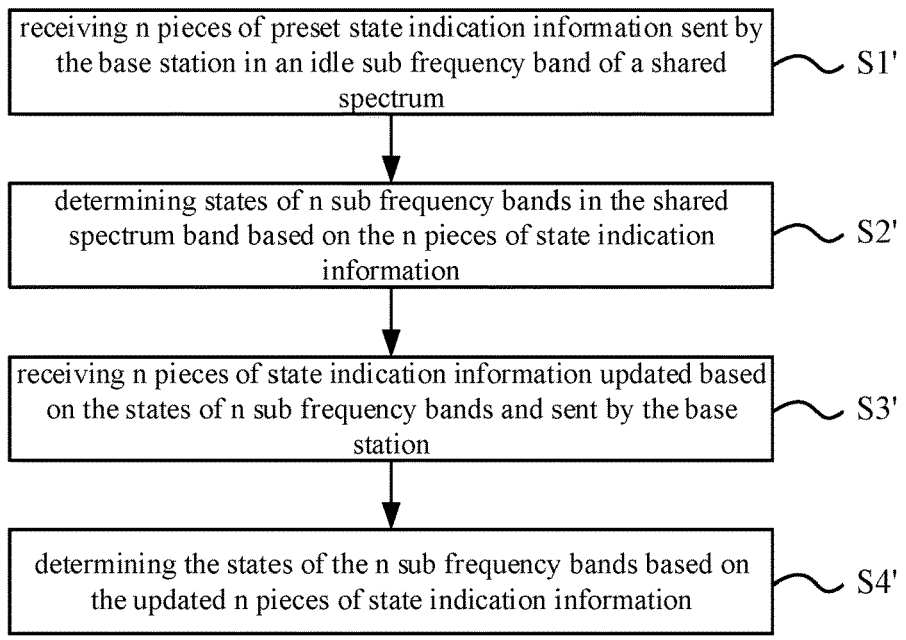
FIG. 6 illustrates a schematic flowchart of another method for determining a frequency band state according to an embodiment of the present disclosure.

FIG. 6 illustrates a schematic flowchart of another method for determining a frequency band state according to an embodiment of the present disclosure. As shown in FIG. 6, the method further includes the following steps.

At S3', n pieces of state indication information that are updated based on states of the n sub frequency bands and sent by the base station is received.

At S4', the states of the n sub frequency bands are determined based on the updated n pieces of state indication information.

In an embodiment, since the n pieces of state information are preset, there may be differences between the n pieces of state information and actual detection results of the base station for the n sub frequency bands. After the base station sends the n pieces of preset state information to the terminal, the base station may update the n pieces of state indication information based on the states of the n sub frequency bands, so that the updated n pieces of state indication information can accurately represent the actual detection results of the base station for the n sub frequency bands. Then, at a position other than the starting position of the occupancy time when the idle sub frequency band is occupied (for example, any position behind the starting position within the occupancy time), the updated n pieces of state indication information are sent to the terminal. The terminal may receive the updated n pieces of state indication information and accurately determine the states of the n sub frequency bands based on the updated n pieces of state indication information.

Figure 7:
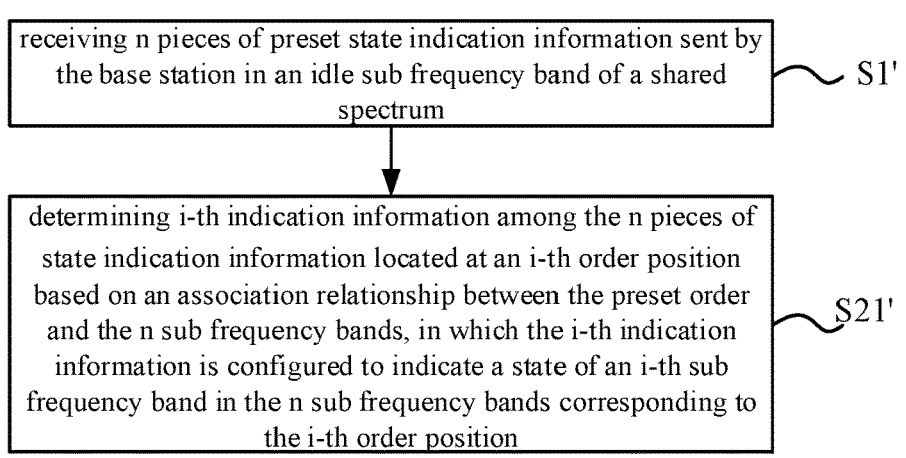
FIG. 7 illustrates a schematic flowchart of yet another method for determining a frequency band state according to an embodiment of the present disclosure.

FIG. 7 illustrates a schematic flowchart of yet another method for determining a frequency band state according to an embodiment of the present disclosure. As shown in FIG. 7, the n pieces of state indication information are arranged in a preset order, and determining the states of the n sub frequency bands based on the n pieces of state indication information includes the following steps.

At S21', i-th indication information among the n pieces of state indication information located at an i-th order position is determined based on an association relationship between the preset order and the n sub frequency bands. The i-th indication information is configured to indicate a state of an i-th sub frequency band in the n sub frequency bands corresponding to the i-th order position, $1 \leq i \leq n$.

In an embodiment, the n pieces of state indication information sent by the base station may be arranged in the preset order, and the preset order may be associated with the n frequency bands. The terminal may store the association relationship in advance, so that the i-th sub frequency band corresponding to the i-th order position may be determined based on the association relationship after the n pieces of state indication information are received, and the i-th indication information located at the i-th order position may be determined, which indicates the state of the i-th sub frequency band, $1 \leq i \leq n$.

For example, taking FIG. 2 as an example, the corresponding relationship between the sub frequency band A, the sub frequency band B, the sub frequency band C, and the sub frequency band D and the preset order is that, the sub frequency band A corresponds to the 1st order position, the sub frequency band B corresponds to the 2nd order position, the frequency band C corresponds to the 3rd order position, and the sub frequency band D corresponds to the 4th order position. The 4 pieces of state indication information (i.e., the state indication information a, the state indication information b, the state indication information c, and the state indication information d) are arranged in accordance with the 1st order position, the 2nd order position, the 3rd order position and the 4th order position.

Then, it may be determined that the state indication information a is configured to indicate the state of the sub frequency band A, the state indication information b is configured to indicate the state of the sub frequency band B, the state indication information c is configured to indicate the state of the sub frequency band C, and the state indication information d is configured to indicate the state of the sub frequency band D.

Figure 8:
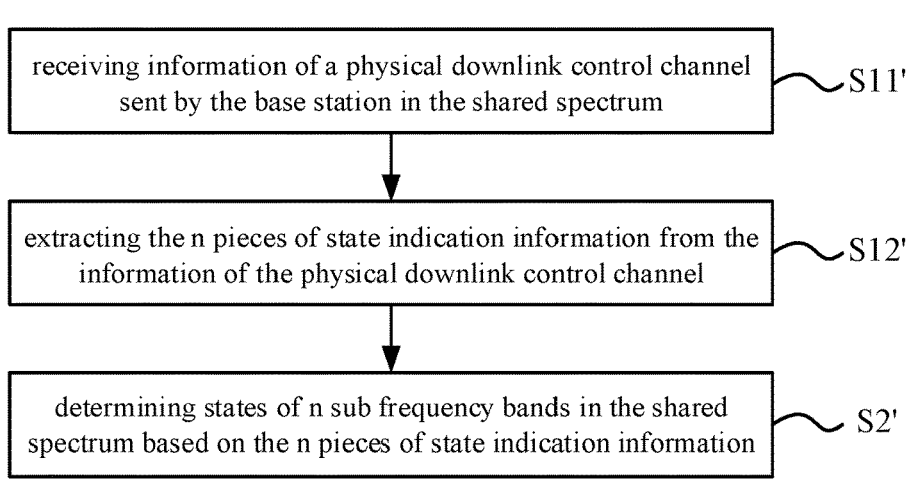
FIG. 8 illustrates a schematic flowchart of yet another method for determining a frequency band state according to an embodiment of the present disclosure.

FIG. 8 illustrates a schematic flowchart of yet another method for determining a frequency band state according to an embodiment of the present disclosure. As shown in FIG. 8, receiving the n pieces of preset state indication information sent by the base station in the idle sub frequency band of the shared spectrum includes the following steps.

At S11', it is received the information of the physical downlink control channel sent by the base station in the shared spectrum.

At S12', the n pieces of state indication information are extracted from the information of the physical downlink control channel.

In an embodiment, the base station may send the information of the physical downlink control channel to the terminal in the shared spectrum, and the n pieces of state indication information may be carried in the information of the physical downlink control channel. The terminal may receive the information of the physical downlink control channel sent by the base station, and extract the n pieces of state indication information from the information of the physical downlink control channel.

Optionally, the state of the i-th sub frequency band in the n sub frequency bands includes one of the following:

The state is idle, or non-idle, or possibly idle.

In an embodiment, the state indication information may be configured to indicate three states: idle, non-idle and possibly idle. Since there may be differences between the n pieces of preset state indication information and the actual detection results of the base station for the n sub frequency bands, the state indication information may also indicate that the sub frequency band is possibly idle in addition to indicating that the sub frequency band is idle and non-idle.

For example, the n pieces of preset state information are set according to the previous detection result of the n sub frequency bands. For example, when the previous detection result for the i-th sub frequency band is that the i-th sub frequency band is idle, the state information for the i-th sub frequency band among the n pieces of preset state information is configured to represent the i-th sub frequency band is idle; for example, when the previous detection result for the i-th sub frequency band is that the i-th sub frequency band is non-idle, the state information for the i-th sub frequency band among the n pieces of preset state information is configured to represent the i-th sub frequency band is non-idle; for example, the i-th sub frequency band has not been detected in the past, that is, there is no previous detection result for the i-th sub frequency band, the state for the i-th sub frequency band among the n pieces of preset state information may represent that the i-th sub frequency band is possibly idle.

Optionally, each of the n pieces of state indication information occupies one bit, or a plurality of bits.

The state indication information may occupy one bit or the plurality of bits.

In case that the state indication information occupies the plurality of bits, taking two bits as an example, since two bits may represent four situations, the above three states of being idle, non-idle and possibly idle may be comprehensively represented for each sub frequency band. For example, the state indicated by the state indication information is shown in Table 1. When the value of the state indication information is 00, it means that the sub frequency band is idle; when the value of the state indication information is 01, it means that the sub frequency band is non-idle, the value of the state indication information is 10, it indicates that the sub frequency band is possibly idle, and the value of the state indication information is 11 is "reserved", it does not indicate the state of the sub frequency band for the time being, so that its expression meaning may be set for subsequent use.

In case that the state indication information occupies one bit, it is difficult for the state indication information to comprehensively represent the above three states of idle, non-idle and possibly idle since one bit of the state indication information can represent two situations. In this case, this is explained in the following examples.

Figure 9:
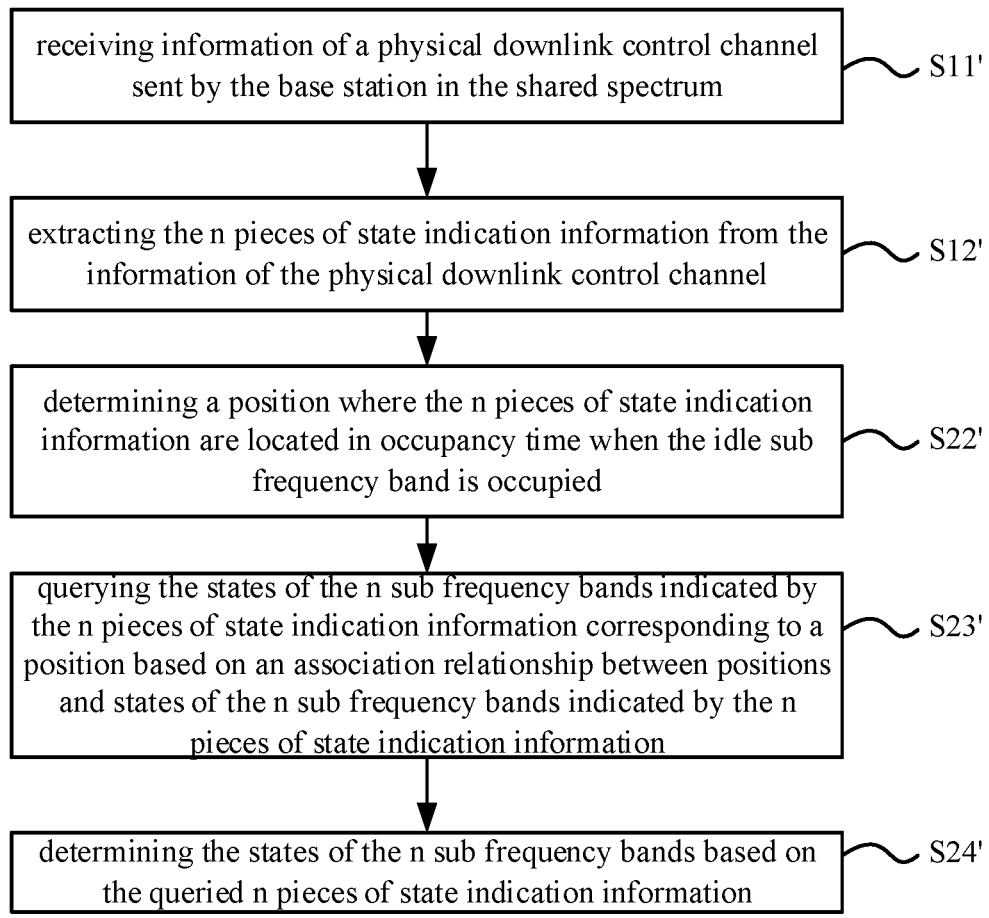
FIG. 9 illustrates a schematic flowchart of yet another method for determining a frequency band state according to an embodiment of the present disclosure.

FIG. 9 illustrates a schematic flowchart of yet another method for determining a frequency band state according to an embodiment of the present disclosure. As shown in FIG. 9, each in the n pieces of state indication information occupies one bit, and determining the states of the n sub frequency bands in the shared spectrum based on the n pieces of state indication information includes the following steps.

At S22', it is determined that a position where the n pieces of state indication information are located in the occupancy time when the idle sub frequency band is occupied.

At S23', the states of then sub frequency bands indicated by then pieces of state indication information corresponding to a position are queried based on an association relationship between positions and values of the n pieces of state indication information.

At S24', the states of the n sub frequency bands are determined based on the queried n pieces of state indication information.

In an embodiment, in case that the state indication information occupies one bit, the terminal may be indicated in combination with the position of the n pieces of state indication information, so that the same state indication information is configured to express different meanings when the n pieces of state indication information are located at different positions within the occupancy time.

The association relationship may be preset between positions and values of the n pieces of state indication information, which may be set for example as follows: when the n pieces of state indication information is located at the starting position of the occupancy time, 1 in the state indication information represents that the corresponding sub frequency band may be idle, and 0 represents that the corresponding sub frequency band is non-idle; when the n pieces of state indication information are located at a position other than the starting position of the occupancy time, 1 in the state indication information represents that the corresponding sub frequency band is idle, and 0 represents that the corresponding sub frequency band is non-idle.

Accordingly, the three states of idle, non-idle and possibly idle may be comprehensively represented by one bit of state information in combination with the position of the n pieces of state indication information in the occupancy time.

Correspondingly, after the n pieces of state indication information are received, the terminal may determine the position of the n pieces of state indication information in the occupancy time when the idle sub frequency band is occupied, and may query the states of the n sub frequency bands indicated by the n pieces of state indication information corresponding to a position based on the association relationship between positions and values of the n pieces of state indication information. In this way, the states of the n sub frequency bands are determined according to the queried values.

For example, the terminal determines that the n pieces of state indication information are located at the starting position in the occupancy time when the idle sub frequency band is occupied, and according to the relationship between positions and states of the n sub frequency bands indicated by the n pieces of state indication information, it may be queried that 1 in the n pieces of state indication information indicates the corresponding sub frequency band is possibly idle, and 0 indicates that the corresponding sub frequency band is non-idle. In this way, when the i-th state indication information is 1, it may be determined that the state of the i-th sub frequency band is possibly idle, and when the i-th state indication information is 0, it may be determined that the state of the i-th sub frequency band is non-idle.

Figure 10:
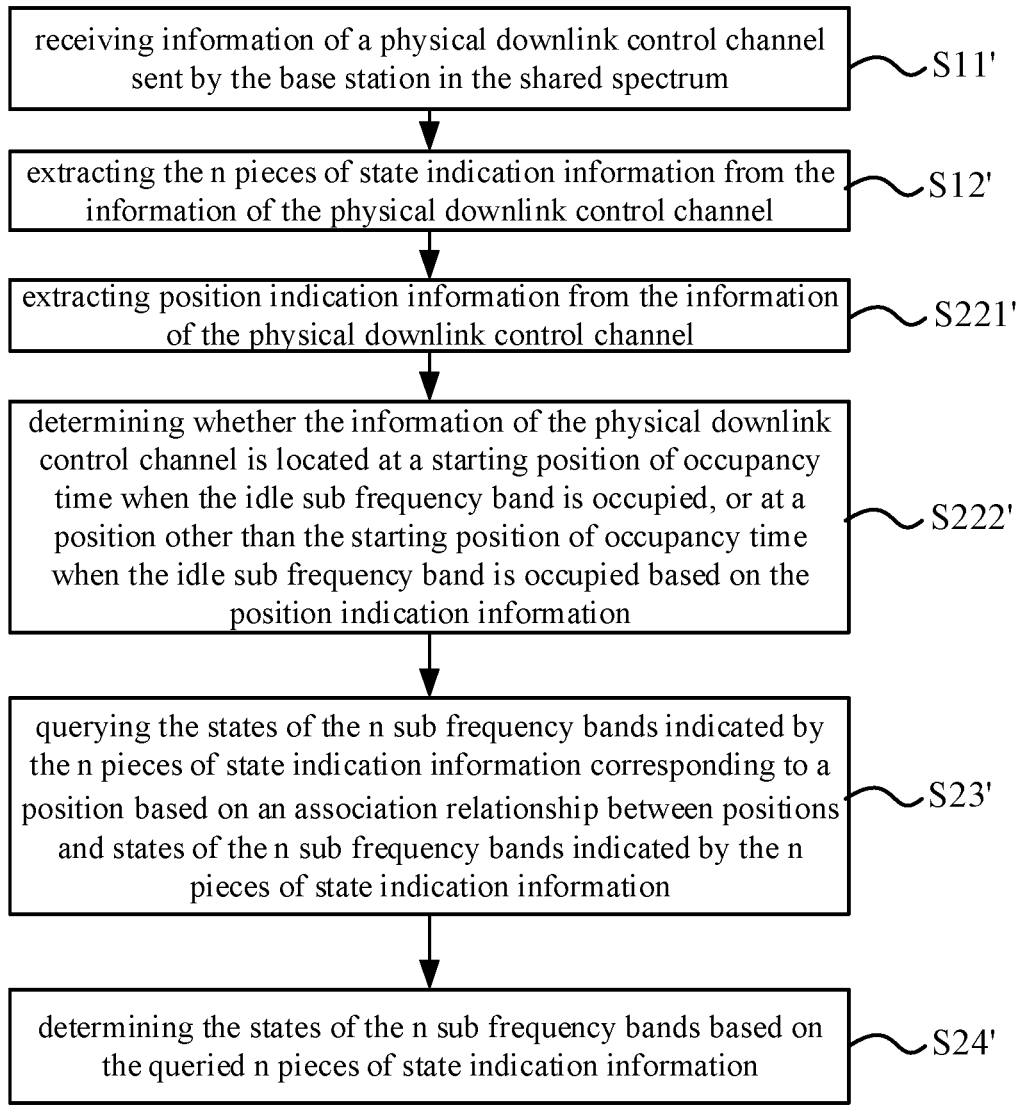
FIG. 10 illustrates a schematic flowchart of yet another method for determining a frequency band state according to an embodiment of the present disclosure.

FIG. 10 illustrates a schematic flowchart of yet another method for determining a frequency band state according to an embodiment of the present disclosure. As shown in FIG. 10, determining the position where the n pieces of state indication information are located in occupancy time when the idle sub frequency band is occupied includes the following steps.

At S221', position indication information is extracted from the information of the physical downlink control channel.

At S222', it is determined based on the position indication information whether the information of the physical downlink control channel is located at a starting position of occupancy time when the idle sub frequency band is occupied, or at a position other than the starting position of occupancy time when the idle sub frequency band is occupied.

In an embodiment, in order to enable the terminal to determine the position of the n pieces of state indication information in the occupancy time when the idle sub frequency band is occupied, the base station may also carry position indication information in the information of the physical downlink control channel sent by the base station. According to the position indication information, the terminal may determine whether the information of the physical downlink control channel is located at the starting position of the occupancy time when the idle sub frequency band is occupied, or at a position other than the starting position of the occupancy time when the idle sub frequency band is occupied.

Figure 11:
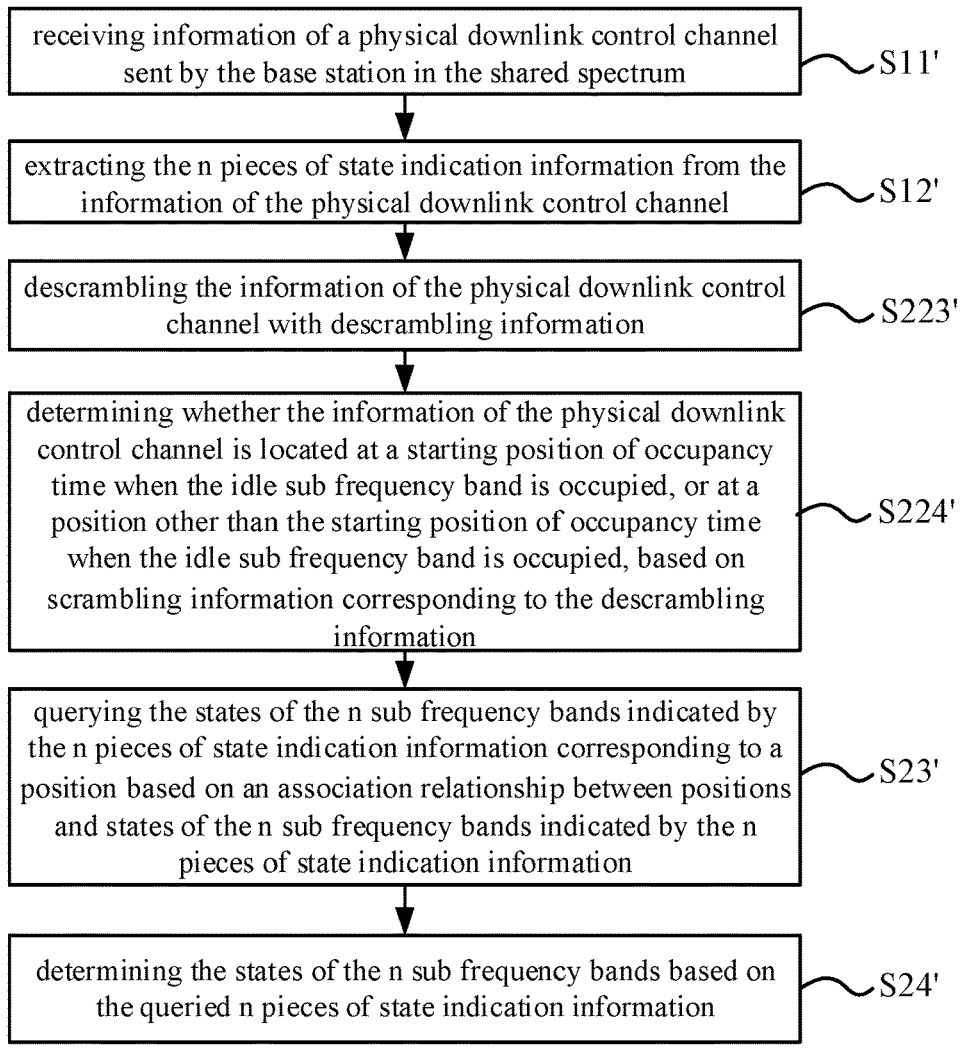
FIG. 11 illustrates a schematic flowchart of yet another method for determining a frequency band state according to an embodiment of the present disclosure.

FIG. 11 illustrates a schematic flowchart of yet another method for determining a frequency band state according to an embodiment of the present disclosure. As shown in FIG. 11, determining the position where the n pieces of state indication information are located in occupancy time when the idle sub frequency band is occupied includes the following steps.

At S223', the information of the physical downlink control channel is descrambled with descrambling information.

At S224', according to scrambling information corresponding to the descrambling information, it is determined whether the information of the physical downlink control channel is located at a starting position of occupancy time when the idle sub frequency band is occupied, or at a position other than the starting position of occupancy time when the idle sub frequency band is occupied.

In an embodiment, in addition to additionally setting the position indication information in the information of the physical downlink control channel, the base station may also use the scrambling information in the information of the physical downlink control channel to indicate the position within the occupancy time where the information of the physical downlink control channel is located to the terminal.

The terminal may descramble the information of the physical downlink control channel through the descrambling information, and determine whether the information of the physical downlink control channel is located at the starting position of the occupancy time when the idle sub frequency band is occupied or at the position other than the starting position of the occupancy time when the idle sub frequency band is occupied, according to the scrambling information corresponding to the descrambling information.

In addition to determining the position within the occupancy time where the information of the physical downlink control channel is located in a manner shown in the above-mentioned embodiments shown in FIG. 10 and FIG. 11, the terminal may also make an agreement with the base station in advance, all information of the physical downlink control channel received from the base station within a preset time period is located at a preset position (such as the starting position) within the occupancy time by default, so that there is no need to further determine the position of the information of the physical downlink control channels received from the base station within the occupancy time, i.e., it may be the preset position by default.

Optionally, the physical downlink control channel is a group common physical downlink control channel.

In an embodiment, the physical downlink control channel may specifically be the group common physical downlink control channel (GC-PDCCH for short). Through the GC-PDCCH, the base station may send the information of the physical downlink control channel to a specific group of terminals.

Optionally, the n sub frequency bands belong to the same carrier, or at least one of the sub frequency bands and other sub frequency bands belong to different carriers, or at least one of the sub frequency bands corresponds to a frequency band of a preset carrier.

In an embodiment, the n sub frequency bands detected by the base station may belong to the same carrier or different carriers. For example, the at least one sub frequency band and other sub frequency bands belong to different carriers. There may also be sub frequency bands corresponding to preset carriers, that is, the sub frequency band is the same as the frequency band of the preset carrier. It may be set according to actual needs to which of the above situations the sub frequency bands specifically belongs.

In an embodiment, the terminal takes appropriate actions on the corresponding sub frequency band in time according to the determined state. From the perspective of receiving information, the actions may include monitoring the corresponding sub frequency band. From the perspective of sending information, the actions may include directly occupying the corresponding sub frequency band, and occupying an i-th sub frequency band in response to detecting in a detection way other than a preset detection way that the i-th sub frequency band is idle, and occupying an i-th sub frequency band in response to detecting in a preset detection way that the i-th sub frequency band is idle.

Figure 12:
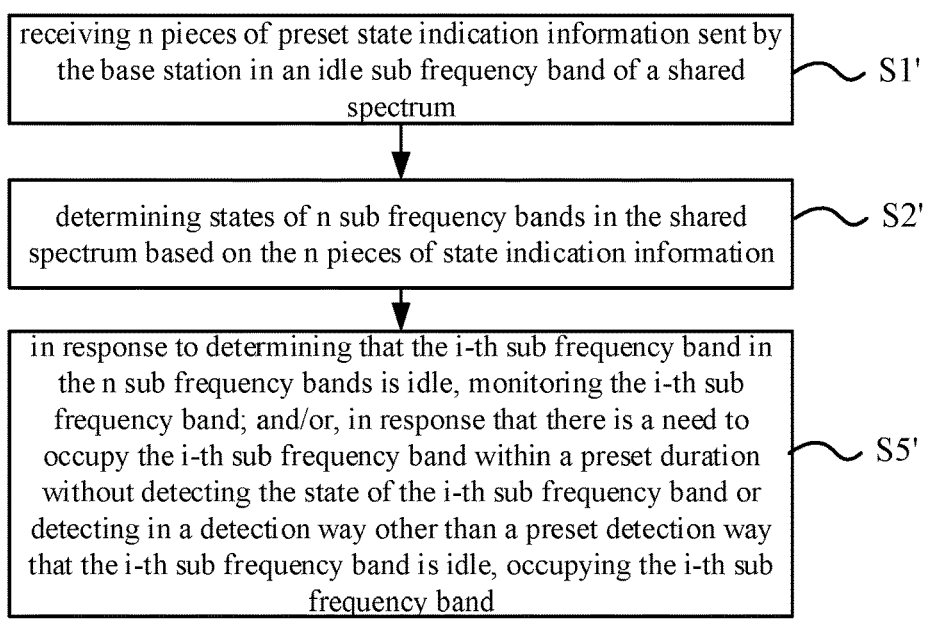
FIG. 12 illustrates a schematic flowchart of yet another method for determining a frequency band state according to an embodiment of the present disclosure.

FIG. 12 illustrates a schematic flowchart of yet another method for determining a frequency band state according to an embodiment of the present disclosure. As shown in FIG. 12, the method further includes the following step.

At S5', in response to determining that the i-th sub frequency band in the n sub frequency bands is idle, the i-th sub frequency band is monitored; and/or in response that there is a need to occupy the i-th sub frequency band within a preset duration, without detecting the state of the i-th sub frequency band or in a detection way other than a preset detection way that the i-th sub frequency band is idle, the i-th sub frequency band is occupied. The preset detection way has a longer detection time and a more accurate detection result relative to the detection way other than the preset detection way.

In an embodiment, in case that the terminal determines that the i-th sub frequency band is idle, the terminal may continue to monitor the i-th sub frequency band. In addition, in case that the i-th sub frequency band needs to be occupied within the preset time period without detecting the state of the i-th sub frequency band, the i-th sub frequency band may be directly occupied to communicate with the base station. Alternatively, when the i-th sub frequency band needs to be occupied within the preset time period and the i-th sub frequency band is detected to be idle in the detection way other than the preset detection way, the i-th sub frequency band is occupied to communicate with the base station.

Monitoring the i-th sub frequency band includes but not limited to receiving control information and downlink data. Occupying by the terminal the i-th sub frequency band to communicate with the base station includes but not limited to sending uplink data to the base station.

The preset detection way has a longer detection time and a more accurate detection result relative to the detection way other than the preset detection way. For example, the preset detection way may be a Cat4 channel detection way, and the other detection way may be a Cat2 channel detection way. In the Cat2 channel detection way, availability of the channel is periodically detected and a one-short channel detection is performed. The Cat4 channel detection way may be initiated at any time based on the service needs. Since there may be a contention window during each detection, the terminal needs to continuously detect whether a channel is idle for a predetermined number of times and when the channel is idle, the terminal may be access to the channel.

In this embodiment, when it is determined that the i-th sub frequency band is idle, the terminal may keep monitoring the i-th sub frequency band, so as to receive in time the control information and data sent by the base station.

Moreover, when it is determined that the i-th sub frequency band is idle, there is a high probability that other devices may not occupy the i-th sub frequency band, so when there is a need to occupy the i-th sub frequency band for communicating with the base station, the i-th sub frequency band may be directly occupied. Alternatively, other relatively less strict detection way is used to detect that the i-th sub frequency band is idle, and the i-th sub frequency band is occupied. Since the detection time of other detection way is relatively short, the i-th sub frequency band is directly occupied. Adopting the other detection way to detect the i-th sub frequency band takes a relatively short time, which is helpful for the terminal to quickly complete sending the data to the base station.

Figure 13:
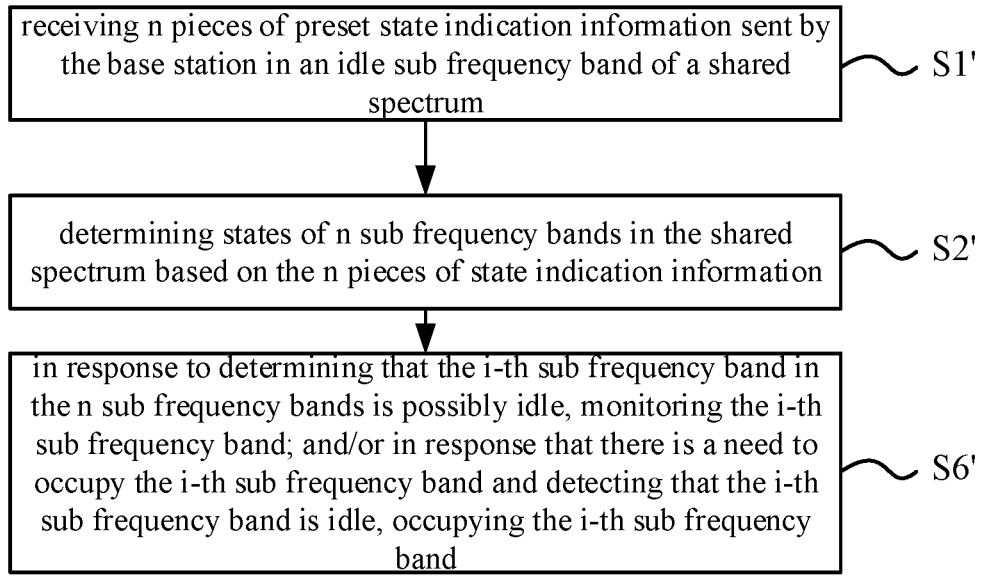
FIG. 13 illustrates a schematic flowchart of yet another method for determining a frequency band state according to an embodiment of the present disclosure.

FIG. 13 illustrates a schematic flowchart of yet another method for determining a frequency band state according to an embodiment of the present disclosure. As shown in FIG. 13, the method further includes the following step.

At S6', in response to determining that the i-th sub frequency band in the n sub frequency bands is possibly idle, the i-th sub frequency band is monitored, and/or in response that there is a need to occupy the i-th sub frequency band and detecting that the i-th sub frequency band is idle, the i-th sub frequency band is occupied.

In an embodiment, the terminal may continue to monitor the i-th sub frequency band when it is determined that the i-th sub frequency band may be idle. And when the i-th sub frequency band needs to be occupied and it is detected (e.g., in a preset detection way) that the i-th sub frequency band is idle, the i-th sub frequency band is occupied to communicate with the base station.

Monitoring the i-th sub frequency band includes but not limited to receiving control information and downlink data. Occupying by the terminal the i-th sub frequency band to communicate with the base station includes but not limited to sending uplink data to the base station. The preset detection way may be a detection way having a long detection time and a relatively accurate detection result, such as a cat4 detection way.

When it is determined that the i-th sub frequency band is possibly idle, there is a high probability that other devices may occupy the i-th sub frequency band. Then, when there is a need to occupy the i-th sub frequency band for communicating with the base station, a relatively strict preset detection way may be adopted. When it is detected the i-th sub frequency band is idle, the i-th sub frequency band is occupied. Since the detection result of the preset detection way is relatively accurate, the i-th sub frequency band is detected by the preset detection way, which may ensure that the terminal may occupy the i-th sub frequency band to complete sending data to the base station when the i-th sub frequency band is not occupied.

In this embodiment, when it is determined that the i-th sub frequency band is possibly idle, the terminal may keep monitoring the i-th sub frequency band, so as to receive the control information and data sent by the base station in time. Moreover, in case that the i-th sub frequency band needs to be occupied to communicate with the base station, the i-th sub frequency band may be occupied when it is detected the i-th sub frequency band is idle, so as to ensure that the i-th sub frequency band is occupied when it is accurately determined the i-th sub frequency band is idle.

Figure 14:
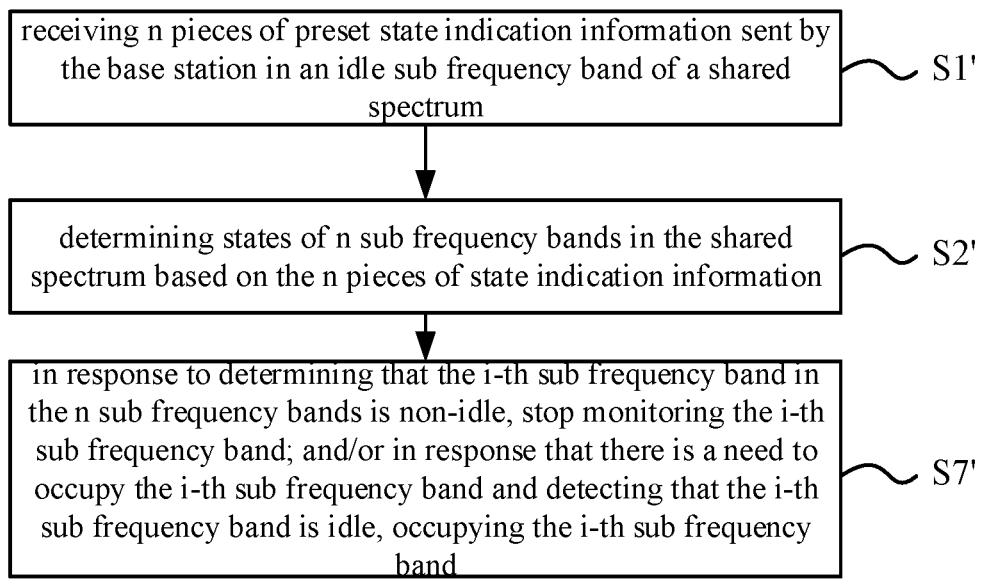
FIG. 14 illustrates a schematic flowchart of yet another method for determining a frequency band state according to an embodiment of the present disclosure.

FIG. 14 illustrates a schematic flowchart of yet another method for determining a frequency band state according to an embodiment of the present disclosure. As shown in FIG. 14, the method further includes the following step.

At S7', in response to determining that the i-th sub frequency band in the n sub frequency bands is non-idle, monitoring the i-th sub frequency band is stopped; and/or in response that there is a need to occupy the i-th sub frequency band and detecting that the i-th sub frequency band is idle, the i-th sub frequency band is occupied.

In an embodiment, the terminal may stop monitoring the i-th sub frequency band when it is determined that the i-th sub frequency band is non-idle. And when the i-th sub frequency band needs to be occupied and it is detected (e.g., by a preset detection way) that the i-th sub frequency band is idle, the i-th sub frequency band is occupied to communicate with the base station. Monitoring the i-th sub frequency band includes but is not limited to receiving control information and downlink data.

Accordingly, unnecessary monitoring of the i-th sub frequency band by the terminal may be avoided, so as to save the power of the terminal, and it may be ensured that the i-th sub frequency band is occupied when it is accurately determined that the i-th sub frequency band is idle.

Figure 15:
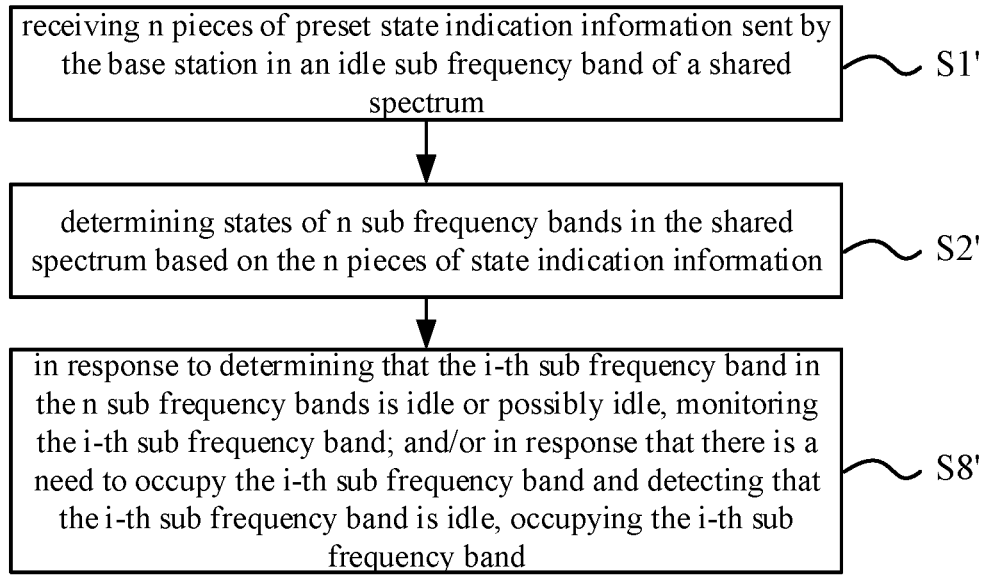
FIG. 15 illustrates a schematic flowchart of yet another method for determining a frequency band state according to an embodiment of the present disclosure.

FIG. 15 illustrates a schematic flowchart of yet another method for determining a frequency band state according to an embodiment of the present disclosure. As shown in FIG. 15, the method further includes the following step.

At S8', in response to determining that the i-th sub frequency band in the n sub frequency bands is idle or possibly idle, the i-th sub frequency band is monitored; and/or in response that there is a need to occupy the i-th sub frequency band and detecting that the i-th sub frequency band is idle, the i-th sub frequency band is occupied.

In an embodiment, the terminal may take different actions respectively in case that the sub frequency band is idle and the sub frequency band is possibly idle, as shown in the embodiments shown in FIG. 12 and FIG. 13.

The same actions may also be taken for these two situations. For example, in response to determining that the i-th sub frequency band in the n sub frequency bands is idle or possibly idle, the i-th sub frequency band may continue to be monitored. When the i-th sub frequency band needs to be occupied and it is detected that the i-th sub frequency band is idle, the i-th sub frequency band may be occupied, in order to receive the control information and data sent by the base station in time, and to ensure that the i-th sub frequency band is occupied when it is accurately determined that the i-th sub frequency band is idle. In addition, since the terminal takes the same action for the two situations, the complexity of the actions performed by the terminal may be reduced.

Optionally, in response to detecting that the i-th sub frequency band is idle, occupying the i-th sub frequency band includes:

in response to detecting in a preset detection way that the i-th sub frequency band is idle, occupying the i-th sub frequency band, in which the preset detection way has a longer detection time and a more accurate detection result relative to a detection way other than the preset detection way.

In any of the above-mentioned embodiments, the i-th sub frequency band is occupied in response to detecting that the i-th sub frequency band is idle, which may be detected by a preset detection way. The preset detection way may be a relatively strict detection way for detecting whether a sub frequency band is idle, such as a cat4 channel detection way. The detection result may be relatively accurate in a relatively strict detection way for detection, which is helpful to ensure that the i-th sub frequency band is occupied when it is accurately determined that the i-th sub frequency band is idle.

Corresponding to the foregoing embodiments of the method for indicating a frequency band state and the method for determining a frequency band state, the embodiments of the present disclosure also provide an apparatus for indicating a frequency band state and an apparatus for determining a frequency band state.

Figure 16:
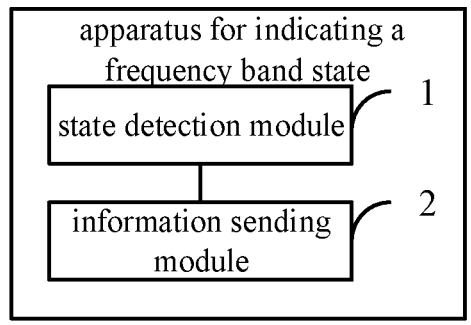
FIG. 16 illustrates a schematic block diagram of an apparatus for indicating a frequency band state according to an embodiment of the present disclosure.

FIG. 16 illustrates a schematic block diagram of an apparatus for indicating a frequency band state according to an embodiment of the present disclosure. The apparatus shown in this embodiment may be applied to a base station, and the base station can communicate with a terminal, for example, may communicate with the terminal based on a 4G protocol or based on a 5G protocol. The base station may communicate with the terminal in a licensed frequency band (for example, a frequency band corresponding to an operator network) or in a shared spectrum (for example, a Wi-Fi frequency band, a Bluetooth frequency band, etc.). The terminal includes but is not limited to an electronic device such as a mobile phone, a tablet computer, and a wearable device.

As shown in FIG. 16, the apparatus for indicating a frequency band state may include a state monitoring module 1 and an information sending module 2.

The state monitoring module 1 is configured to detect states of n sub frequency bands in a shared spectrum, $n \geq 1$.

The information sending module 2 is configured to in response that there is an idle sub frequency band in the n frequency bands, send n pieces of preset state indication information to a terminal through the idle sub frequency band at a starting position of occupancy time when the idle sub frequency band is occupied. The n pieces of state indication information are configured to indicate the states of the n sub frequency bands.

Figure 17:
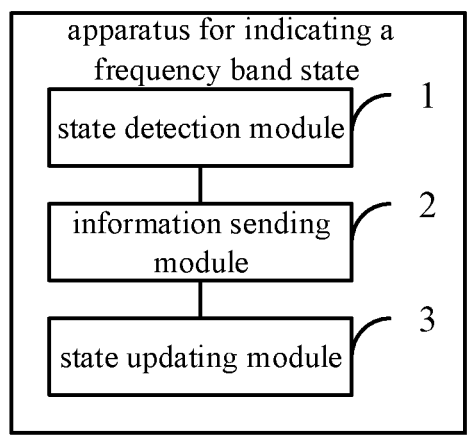
FIG. 17 illustrates a schematic block diagram of another apparatus for indicating a frequency band state according to an embodiment of the present disclosure.

FIG. 17 illustrates a schematic block diagram of another apparatus for indicating a frequency band state according to an embodiment of the present disclosure. As shown in FIG. 17, the apparatus further includes a state updating module 3.

The state updating module 3 is configured to update the n pieces of state indication information based on the states of n sub frequency bands.

The information sending module 2 is further configured to send the updated n pieces of state indication information to the terminal at a position other than the starting position of the occupancy time when the idle sub frequency band is occupied.

Optionally, the n pieces of state indication information are arranged in a preset order, and the preset order is associated with the n sub frequency bands.

Optionally, the information sending module is configured to send information of a physical downlink control channel to the terminal, in which the information of the physical downlink control channel is carried with the n pieces of state indication information.

Optionally, the state of the i-th sub frequency band in the n sub frequency bands comprises one of:

The state is idle, or non-idle, or possibly idle.

Optionally, each of the n pieces of state indication information occupies one bit, or a plurality of bits.

Optionally, each in the n pieces of state indication information occupies one bit, and the information of the physical downlink control channel is also carried with position indication information, in which the position indication information is configured to indicate whether the information of the physical downlink control channel is located at the starting position of the occupancy time when the idle sub frequency band is occupied, or at a position other than the starting position of the occupancy time when the idle sub frequency band is occupied.

Optionally, each in the n pieces of state indication information occupies one bit, and scrambling information in the information of the physical downlink control channel is configured to indicate whether the information of the physical downlink control channel is located at the starting position of the occupancy time when the idle sub frequency band is occupied, or at a position other than the starting position of the occupancy time when the idle sub frequency band is occupied.

Optionally, the physical downlink control channel is a group common physical downlink control channel.

Optionally, the n sub frequency bands belong to the same carrier, or at least one of the sub frequency bands and other sub frequency bands belong to different carriers, or at least one of the sub frequency bands corresponds to a frequency band of a preset carrier.

Figure 18:
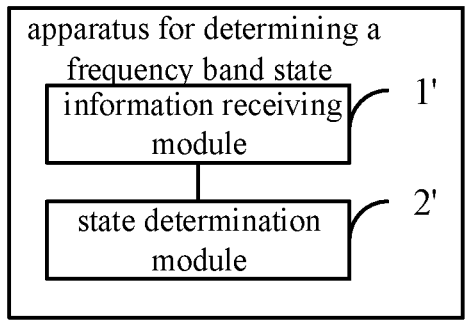
FIG. 18 illustrates a schematic block diagram of an apparatus for determining a frequency band state according to an embodiment of the present disclosure.

FIG. 18 illustrates a schematic block diagram of an apparatus for determining a frequency band state according to an embodiment of the present disclosure. The apparatus shown in this embodiment may be applied to a terminal. The terminal may communicate with a base station (such as the base station described in any of the above embodiments), for example, may communicate with the base station based on a 4G protocol or based on a 5G protocol. The terminal may communicate with the base station in a licensed frequency band (for example, a frequency band corresponding to an operator network), or in a shared spectrum (for example, a Wi-Fi frequency band, a Bluetooth frequency band, etc.). The terminal includes but is not limited to an electronic device such as a mobile phone, a tablet computer, and a wearable device.

As shown in FIG. 18, the apparatus for determining a frequency band state may include an information receiving module 1' and a state determination module 2'.

The information receiving module 1' is configured to receive n pieces of preset state indication information sent by the base station in an idle sub frequency band of a shared spectrum, $n \geq 1$.

The state determination module 2' is configured to determine states of n sub frequency bands in the shared spectrum based on the n pieces of state indication information.

Optionally, the information receiving module is further configured to receive n pieces of state indication information that are updated based on states of n sub frequency bands and sent by the base station and determine the states of the n sub frequency bands based on the updated n pieces of state indication information.

Optionally, the n pieces of state indication information are arranged in a preset order, and the state determination module is configured to determine i-th indication information among the n pieces of state indication information located at an i-th order position based on an association relationship between the preset order and the n sub frequency bands, in which the i-th indication information is configured to indicate a state of an i-th sub frequency band in the n sub frequency bands corresponding to the i-th order position, $1 \leq i \leq n$.

Optionally, the information receiving module is configured to receive information of a physical downlink control channel sent by the base station in the shared spectrum; and extract the n pieces of state indication information from the information of the physical downlink control channel.

Optionally, a state of an i-th sub frequency band in the n sub frequency bands includes one of the following:

The state is idle, or non-idle, possibly idle.

Optionally, each of the n pieces of state indication information occupies one bit, or occupies a plurality of bits.

Figure 19:
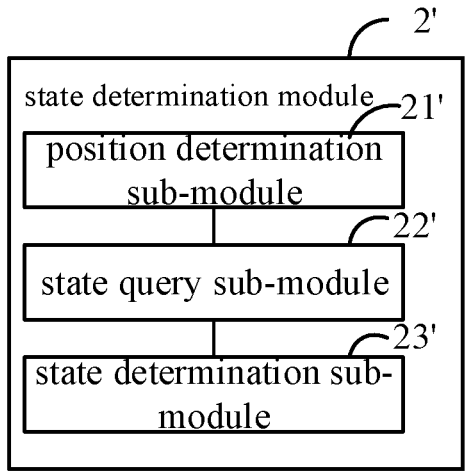
FIG. 19 illustrates a schematic block diagram of a state determination module according to an embodiment of the present disclosure.

FIG. 19 illustrates a schematic block diagram of a state determination module according to an embodiment of the present disclosure. As shown in FIG. 19, each in the n pieces of state indication information occupies one bit, and the state determination module 2' includes a position determination sub-module 21', a state query sub-module 22', and a state determination sub-module 23'.

The location determination sub-module 21' is configured to determine a position where the n pieces of state indication information are located in occupancy time when the idle sub frequency band is occupied.

The state query sub-module 22' is configured to query the states of the n sub frequency bands indicated by the n pieces of state indication information corresponding to a position based on an association relationship between positions and values of the n pieces of state indication information.

The state determination sub-module 23' is configured to determine the states of the n sub frequency bands based on the queried n pieces of state indication information.

Optionally, the position determination sub-module is configured to extract position indication information from the information of the physical downlink control channel; and determine whether the information of the physical downlink control channel is located at a starting position of occupancy time when the idle sub frequency band is occupied, or at a position other than the starting position of occupancy time when the idle sub frequency band is occupied based on the position indication information.

Optionally, the position determination sub-module is configured to descramble the information of the physical downlink control channel with descrambling information; and determine whether the information of the physical downlink control channel is located at a starting position of occupancy time when the idle sub frequency band is occupied, or at a position other than the starting position of occupancy time when the idle sub frequency band is occupied, based on scrambling information corresponding to the descrambling information.

Optionally, the physical downlink control channel is a group common physical downlink control channel.

Optionally, the n sub frequency bands belong to the same carrier, or at least one of the sub frequency bands and other sub frequency bands belong to different carriers, or at least one of the sub frequency bands corresponds to a frequency band of a preset carrier.

Figure 20:
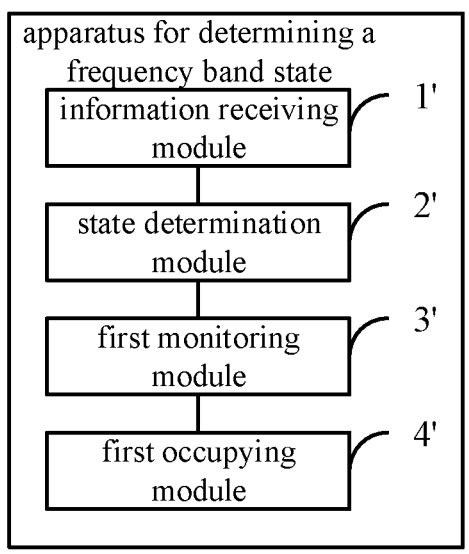
FIG. 20 illustrates a schematic block diagram of another apparatus for determining a frequency band state according to an embodiment of the present disclosure.

FIG. 20 illustrates a schematic block diagram of another apparatus for determining a frequency band state according to an embodiment of the present disclosure. As shown in FIG. 20, the apparatus further includes a first monitoring module 3' and/or a first occupying module 4'.

The first monitoring module 3' is configured to monitor the i-th sub frequency band in response to determining that the i-th sub frequency band in the n sub frequency bands is idle.

The first occupying module 4' is configured to occupy the i-th sub frequency band in response that there is a need to occupy the i-th sub frequency band within a preset duration without detecting the state of the i-th sub frequency band or in a detection way other than a preset detection way that the i-th sub frequency band is idle, in which the preset detection way has a longer detection time and a more accurate detection result than other detection way.

Figure 21:
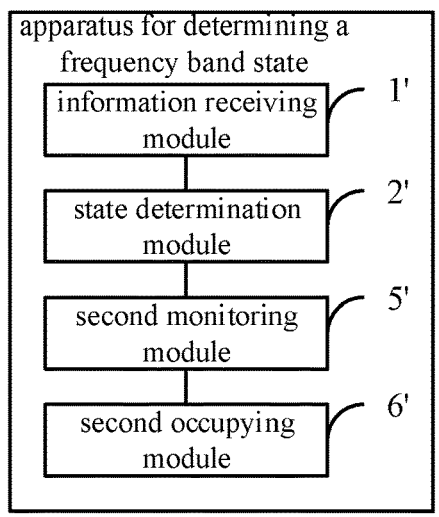
FIG. 21 illustrates a schematic block diagram of yet another apparatus for determining a frequency band state according to an embodiment of the present disclosure.

FIG. 21 illustrates a schematic block diagram of yet another apparatus for determining a frequency band state according to an embodiment of the present disclosure. As shown in FIG. 21, the apparatus further includes a second monitoring module 5', and/or a second occupying module 6'.

The second monitoring module 5' is configured to monitor the i-th sub frequency band in response to determining that the i-th sub frequency band in the n sub frequency bands is possibly idle.

The second occupying module 6' is configured to occupy the i-th sub frequency band in response that there is a need to occupy the i-th sub frequency band and detecting that the i-th sub frequency band is idle.

Figure 22:
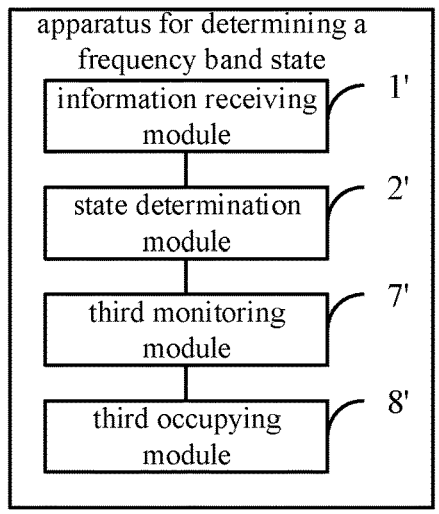
FIG. 22 illustrates a schematic block diagram of yet another apparatus for determining a frequency band state according to an embodiment of the present disclosure.

FIG. 22 illustrates a schematic block diagram of yet another apparatus for determining a frequency band state according to an embodiment of the present disclosure. As shown in FIG. 22, the apparatus further includes a third monitoring module 7' and/or a third occupying module 8'.

The third monitoring module 7' is configured to stop monitoring the i-th sub frequency band in response to determining that the i-th sub frequency band in the n sub frequency bands is non-idle.

The third occupying module 8' is configured to occupy the i-th sub frequency band in response that there is a need to occupy the i-th sub frequency band and detecting that the i-th sub frequency band is idle.

Figure 23:
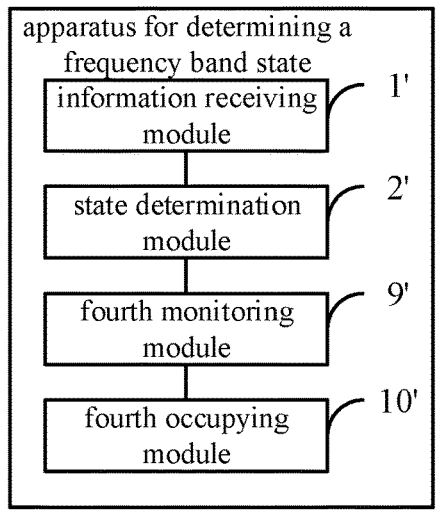
FIG. 23 illustrates a schematic block diagram of yet another apparatus for determining a frequency band state according to an embodiment of the present disclosure.

FIG. 23 illustrates a schematic block diagram of yet another apparatus for determining a frequency band state according to an embodiment of the present disclosure. As shown in FIG. 23, the apparatus further includes a fourth monitoring module 9' and/or a fourth occupying module 10'.

The fourth monitoring module 9' is configured to monitor the i-th sub frequency band in response to determining that the i-th sub frequency band in the n sub frequency bands is idle or possibly idle.

The fourth occupying module 10' is configured to occupy the i-th sub frequency band in response that there is a need to occupy the i-th sub frequency band and detecting that the i-th sub frequency band is idle.

Optionally, the second occupying module, and/or the third occupying module, and/or the fourth occupying module are configured to occupy the i-th sub frequency band in response to detecting in a preset detection way that the i-th sub frequency band is idle. The preset detection way has a longer detection time and a more accurate detection result relative to a detection way other than the preset detection way.

Regarding the apparatuses in the foregoing embodiments, the specific manners in which each module performs operations have been described in detail in the related method embodiments, which may not be described in detail here.

For the apparatus embodiments, since they basically correspond to the method embodiments, reference may be made to the partial descriptions of the method embodiments for related parts. The apparatus embodiments described above are exemplary, in which the modules described as separate components may or may not be physically separated, and the components displayed as modules may or may not be physical modules, that is, they may be located in one place, or may be distributed over a plurality of network modules. Some or all of the modules may be selected according to actual needs to achieve the purpose of the solution in this embodiment. Those skilled in the art may understand and implement it without creative efforts.

The present disclosure also proposes an electronic device, which includes:
a processor; and
a memory for storing instructions executable by the processor;

The processor is configured to implement the method for indicating a frequency band state described in any of the foregoing embodiments.

The present disclosure also proposes an electronic device, which includes:
a processor; and
a memory for storing instructions executable by the processor;

The processor is configured to implement the method for determining a frequency band state described in any of the foregoing embodiments.

Figure 24:
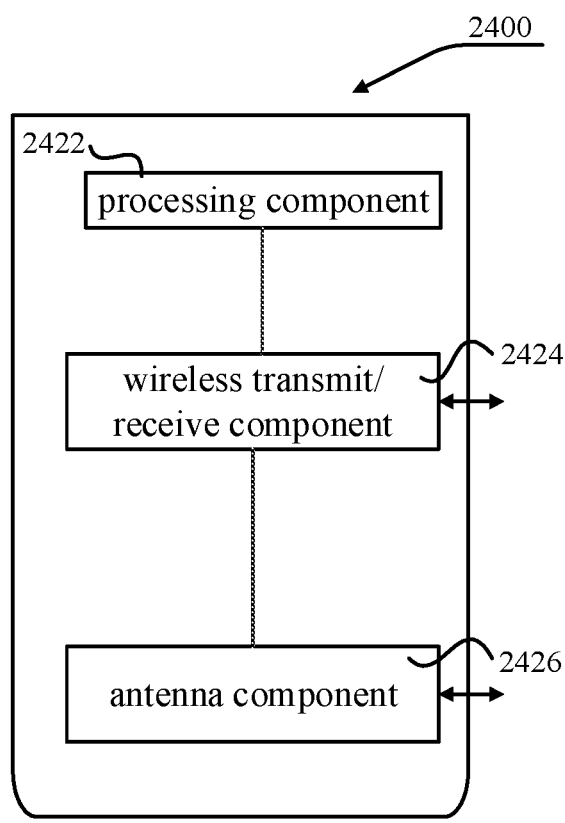
FIG. 24 illustrates a schematic diagram of a device for indicating a frequency band state according to an embodiment of the present disclosure.

As shown in FIG. 24, a schematic diagram of a device for indicating a frequency band state according to an embodiment of the present disclosure, the device 2400 may be provided as a base station. Referring to FIG. 24, the device 2400 includes a processing component 2422, a wireless transmit/receive component 2424, an antenna component 2426, and a signal processing portion specific to a wireless interface. The processing component 2422 may further include one or more processors. One of the processors in the processing component 2422 may be configured to implement the method for indicating a frequency band state described in any of the foregoing embodiments.

Figure 25:
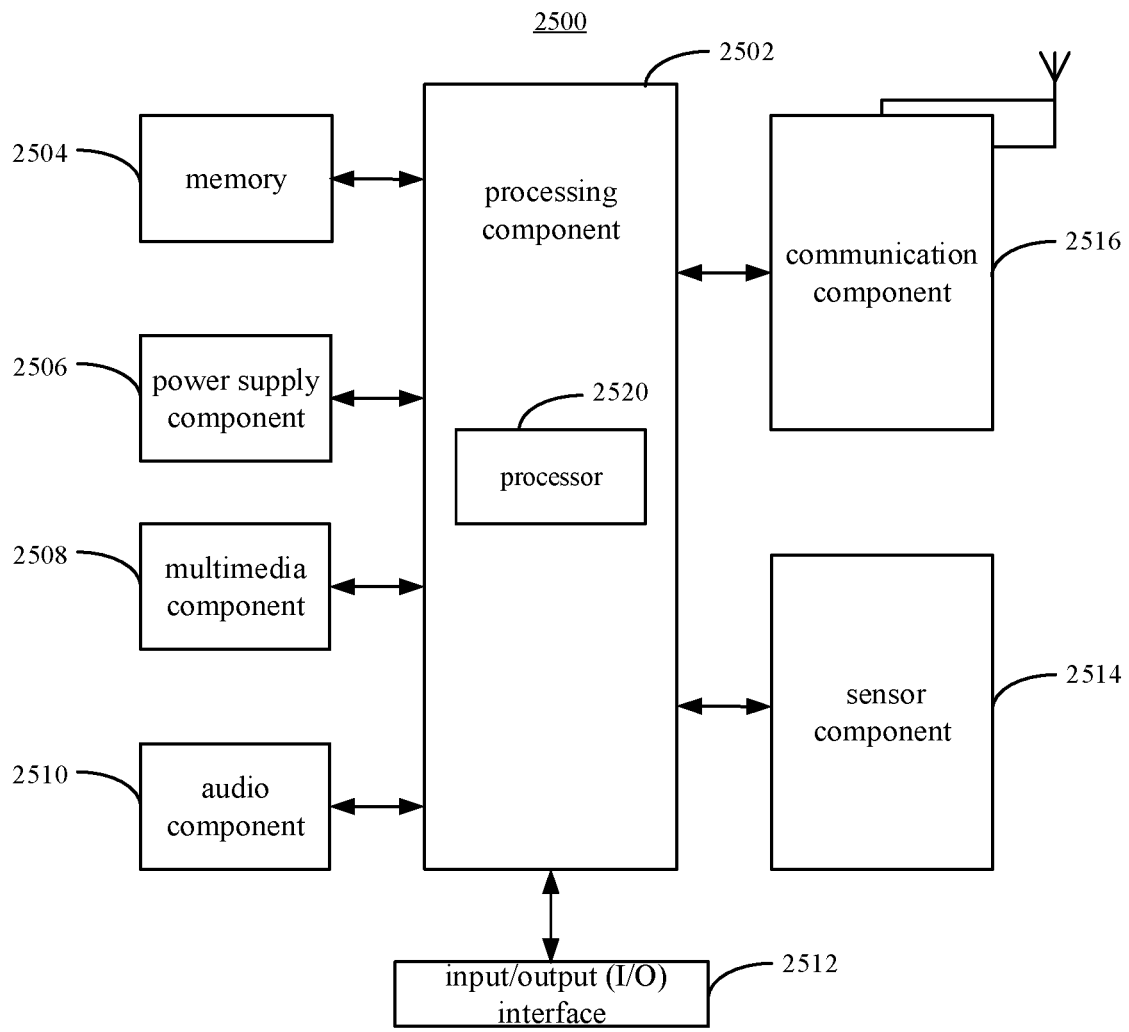
FIG. 25 illustrates a schematic diagram of a device for determining a frequency band state according to an embodiment of the present disclosure.

FIG. 25 illustrates a schematic diagram of a device 2500 for determining a frequency band state according to an embodiment of the present disclosure. For example, device 2500 may be a mobile phone, a computer, a digital broadcast terminal, a messaging device, a game console, a tablet device, a medical device, a fitness device, a personal digital assistant, and the like.

Referring to FIG. 25, the device 2500 may include one or more of the following components: a processing component 2502, a memory 2504, a power supply component 2506, a multimedia component 2508, an audio component 2510, an input/output (I/O) interface 2512, a sensor component 2514, and a communication component 2516.

The processing component 2502 generally controls overall operations of the device 2500, such as operations associated with display, phone calls, data communications, camera operations, and recording operations. The processing component 2502 may include one or more processors 2520 to execute instructions to perform all or some of the steps of the methods described above. Additionally, the processing component 2502 may include one or more modules that facilitate interactions between the processing component 2502 and other components. For example, the processing component 2502 may include a multimedia module for facilitating interaction between the multimedia component 2508 and the processing component 2502.

The memory 2504 is configured to store various types of data to support the operations at device 2500. Examples of such data include instructions for any application or method operating on the device 2500, contact data, phonebook data, messages, pictures, videos, and the like. The memory 2504 may be implemented by any type of volatile or non-volatile storage devices or their combination, such as a static random access memory (SRAM), an electrically erasable programmable read only memory (EEPROM), an erasable Programmable Read Only Memory (EPROM), a Programmable Read Only Memory (PROM), a Read Only Memory (ROM), a magnetic memory, a flash memory, a magnetic or optical disk.

The power supply component 2506 provides power to various components of the device 2500. The power components 2506 may include a power management system, one or more power supplies, and other components associated with generating, managing, and distributing power to the device 2500.

The multimedia component 2508 includes a screen that provides an output interface between the device 2500 and a user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensor may not only sense the boundaries of a touch or swipe action, but also detect the time and pressure associated with the touch or swipe action. In some embodiments, the multimedia component 2508 includes a front-facing camera and/or a rear-facing camera. When the device 2500 is in an operation mode, such as a shooting mode or a video mode, the front camera and/or the rear camera may receive external multimedia data. Each of the front and rear cameras may be a fixed optical lens system or have focal length and optical zoom capability.

The audio component 2510 is configured to output and/or input audio signals. For example, the audio component 2510 includes a microphone (MIC) that is configured to receive external audio signals when device 2500 is in an operating mode, such as a call mode, a recording mode, and a voice recognition mode. The received audio signals may be further stored in the memory 2504 or transmitted via the communication component 2516. In some embodiments, the audio component 2510 also includes a speaker for outputting audio signals.

The I/O interface 2512 provides an interface between the processing component 2502 and a peripheral interface module, which may be a keyboard, a click wheel, a button, and the like. These buttons may include, but are not limited to: home buttons, volume buttons, start buttons, and lock buttons.

The sensor assembly 2514 includes one or more sensors for providing state assessment of various aspects of the device 2500. For example, the sensor assembly 2514 can detect the open/closed state of the device 2500, the relative positioning of components, such as the display and keypad of the device 2500. The sensor assembly 2514 may also detect a change in position of the device 2500 or a component of the device 2500, a presence or absence of contacts between the users and the device 2500, an orientation or acceleration/deceleration of the device 2500 and a temperature change of the device 2500. The sensor assembly 2514 may include a proximity sensor configured to detect the presence of nearby objects in the absence of any physical contact. The sensor assembly 2514 may also include a light sensor, such as a CMOS or CCD image sensor, for use in imaging applications. In some embodiments, the sensor component 2514 may also include an acceleration sensor, a gyroscope sensor, a magnetic sensor, a pressure sensor, or a temperature sensor.

The communication component 2516 is configured to facilitate wired or wireless communication between the device 2500 and other devices. The device 2500 may access wireless networks based on communication standards, such as WiFi, 2G or 3G, 4G LTE, 5G NR, or their combination. In an embodiment, the communication component 2516 receives broadcast signals or broadcast related information from an external broadcast management system via a broadcast channel. In an embodiment, the communication component 2516 also includes a near field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology and other technologies.

In an embodiment, the device 2500 may be implemented by one or more application specific integrated circuits (ASICs), digital signal processors (DSPs), digital signal processing devices (DSPDs), programmable logic devices (PLDs), a field programmable gate array (FPGA), a controller, a microcontroller, a microprocessor or other electronic components, which is configured to execute the method for determining a frequency band state described in any one of the above embodiments.

In an embodiment, there is also provided a non-transitory computer-readable storage medium including instructions, such as the memory 2504 including instructions, executable by the processor 2520 of the device 2500 to perform the method described above. For example, the non-transitory computer-readable storage medium may be a ROM, a random access memory (RAM), CD-ROM, a magnetic tape, a floppy disk, an optical data storage device, and the like.

Those skilled in the art may be readily aware of other embodiments of the present disclosure upon consideration of the specification and practice of the disclosure disclosed herein. The disclosure is intended to cover any variations, uses, or adaptations of the disclosure that follow the general principles of this disclosure and include common general knowledge or conventional technical means in the art not disclosed by the disclosure. The specification and examples are to be regarded as exemplary, with the true scope of the disclosure being indicated in the following claims.

It should be understood that the present disclosure is not limited to the precise structures described above and illustrated in the accompanying drawings, and that various modifications and changes may be made without departing from the scope of the disclosure. The scope of the present disclosure is limited by the appended claims.

It should be noted that, in this document, relational terms such as first and second are used to distinguish one entity or operation from another entity or operation, and do not necessarily require or imply any relationship or sequence is existed between these entities or operations. The terms "comprise", "include" or any other variation are intended to encompass non-exclusive inclusion such that a process, a method, an article or a device containing a list of elements includes not only those elements, but also other not expressly listed elements, or also include elements inherent to such a process, method, article or device. Without further limitation, an element qualified by the phrase "comprising a . . . " does not preclude the presence of additional identical elements in a process, method, article or device that includes the element.

The methods and apparatuses according to the embodiments of the present disclosure have been described in detail above, and specific examples are configured to illustrate the principles and implementations of the present disclosure. The description of the above embodiments are used to help understand the method and core concept of the disclosure. At the same time, for those skilled in the art, there may be changes in the specific implementation and application field according to the concept of the present disclosure. In summary, the contents of this specification should not be construed as limiting the present disclosure.

What is claimed is:

1. A method for indicating a frequency band state, performed by a base station, comprising:
    detecting states of n sub frequency bands in a shared spectrum, n≥1;
    sending n pieces of preset state indication information to a terminal, wherein the n pieces of preset state indication information are configured to indicate the states of the n sub frequency bands; the n pieces of preset state indication information are arranged in a preset order, and the preset order is associated with the n sub frequency bands;
    updating the n pieces of preset state indication information based on the detected states of n sub frequency bands to obtain updated n pieces of state indication information; and
    sending the updated n pieces of state indication information to the terminal.

2. The method of claim 1, wherein sending the updated n pieces of state indication information to the terminal comprises:
    sending the updated n pieces of state indication information to the terminal at a position other than the starting position of the occupancy time when the idle sub frequency band is occupied.

3. The method of claim 1, wherein sending the n pieces of preset state indication information to the terminal comprises:
    sending information of a physical downlink control channel to the terminal, wherein the information of the physical downlink control channel is carried with the n pieces of preset state indication information.

4. The method of claim 3, wherein the state of the i-th sub frequency band in the n sub frequency bands comprises one of: idle, or non-idle, or possibly idle; and
    wherein each of the n pieces of preset state indication information occupies one bit, or a plurality of bits.

5. The method of claim 4, wherein each in the n pieces of preset state indication information occupies one bit, and the information of the physical downlink control channel is also carried with position indication information, in which the position indication information is configured to indicate whether the information of the physical downlink control channel is located at the starting position or at a position other than the starting position within the occupancy time when the idle sub frequency band is occupied.

6. The method of claim 4, wherein each in the n pieces of preset state indication information occupies one bit, and scrambling information included in the information of the physical downlink control channel is configured to indicate whether the information of the physical downlink control channel is located at the starting position or at a position other than the starting position within the occupancy time when the idle sub frequency band is occupied.

7. The method of claim 3, wherein the physical downlink control channel is a group common physical downlink control channel.

8. The method of claim 1, wherein the n sub frequency bands belong to the same carrier, or belong to different carriers, or at least one of the sub frequency bands corresponds to a frequency band of a preset carrier.

9. A method for determining a frequency band state, performed by a terminal, comprising:
    receiving n pieces of preset state indication information sent by the base station, n≥1, wherein the n pieces of preset state indication information are arranged in a preset order;

determining states of n sub frequency bands in the shared spectrum based on the n pieces of preset state indication information;

receiving, from the base station, n pieces of state indication information updated based on the states of n sub frequency bands; and determining the states of the n sub frequency bands based on the updated n pieces of state indication information;

determining the states of the n sub frequency bands based on the n pieces of preset state indication information comprises:

determining i-th indication information among the n pieces of preset state indication information located at an i-th order position based on an association relationship between the preset order and the n sub frequency bands, in which the i-th indication information is configured to indicate a state of an i-th sub frequency band in the n sub frequency bands corresponding to the i-th order position, 1≤i≤n.

10. The method of claim 9, wherein receiving the n pieces of preset state indication information sent by the base station comprises:

receiving information of a physical downlink control channel sent by the base station; and extracting the n pieces of preset state indication information from the information of the physical downlink control channel.

11. The method of claim 10, wherein a state of an i-th sub frequency band in the n sub frequency bands comprises one of: idle, or non-idle, or possibly idle; and wherein each of the n pieces of state indication information occupies one bit, or a plurality of bits.

12. The method of claim 11, wherein each in the n pieces of state indication information occupies one bit, and determining the states of the n sub frequency bands comprises:

determining a position where the n pieces of preset state indication information are located in occupancy time when the idle sub frequency band is occupied; and querying values of the n pieces of preset state indication information corresponding to the position based on an association relationship between positions and values of the n pieces of preset state indication information; and determining the states of the n sub frequency bands based on the queried values.

13. The method of claim 12, wherein determining the position where the n pieces of preset state indication information are located in occupancy time when the idle sub frequency band is occupied comprises:

extracting position indication information from the information of the physical downlink control channel; and determining whether the information of the physical downlink control channel is located at a starting position or at a position other than the starting position within the occupancy time when the idle sub frequency band is occupied based on the position indication information.

14. The method of claim 12, wherein determining the position where the n pieces of preset state indication information are located in occupancy time when the idle sub frequency band is occupied comprises:

descrambling the information of the physical downlink control channel with descrambling information; and determining whether the information of the physical downlink control channel is located at a starting position or at a position other than the starting position within the occupancy time when the idle sub frequency band is occupied, based on scrambling information corresponding to the descrambling information.

15. The method of claim 11, further comprising one of:

in response to determining that the i-th sub frequency band in the n sub frequency bands is idle, monitoring the i-th sub frequency band; and/or, in response that there is a need to occupy the i-th sub frequency band within a preset duration without detecting the state of the i-th sub frequency band or detecting in a detection way other than a preset detection way that the i-th sub frequency band is idle, occupying the i-th sub frequency band, in which the preset detection way has a longer detection time and a more accurate detection result than other detection way;

in response to determining that the i-th sub frequency band in the n sub frequency bands is possibly idle, monitoring the i-th sub frequency band; and/or in response that there is a need to occupy the i-th sub frequency band and detecting that the i-th sub frequency band is idle, occupying the i-th sub frequency band;

in response to determining that the i-th sub frequency band in the n sub frequency bands is non-idle, stop monitoring the i-th sub frequency band; and/or in response that there is a need to occupy the i-th sub frequency band and detecting that the i-th sub frequency band is idle, occupying the i-th sub frequency band;

in response to determining that the i-th sub frequency band in the n sub frequency bands is idle or possibly idle, monitoring the i-th sub frequency band; and/or in response that there is a need to occupy the i-th sub frequency band and detecting that the i-th sub frequency band is idle, occupying the i-th sub frequency band.

16. The method of claim 15, wherein in response to detecting that the i-th sub frequency band is idle, occupying the i-th sub frequency band comprises:

in response to detecting in a preset detection way that the i-th sub frequency band is idle, occupying the i-th sub frequency band, wherein the preset detection way has a longer detection time and a more accurate detection result relative to a detection way other than the preset detection way.

17. A terminal, comprising:

a processor; and a memory for storing instructions executable by the processor;

wherein the processor is configured to:

receive n pieces of preset state indication information sent by the base station, n≥1, wherein the n pieces of preset state indication information are arranged in a preset order;

determine states of n sub frequency bands in the shared spectrum based on the n pieces of preset state indication information;

receive, from the base station, n pieces of state indication information updated based on the states of n sub frequency bands; and determine the states of the n sub frequency bands based on the updated n pieces of state indication information;

wherein the processor is further configured to:

determine i-th indication information among the n pieces of preset state indication information located at an i-th order position based on an association relationship between the preset order and the n sub frequency bands, in which the i-th indication information is configured to indicate a state of an i-th sub frequency band in the n sub frequency bands corresponding to the i-th order position, $1 \leq i \leq n$.

\* \* \* \* \*